US012083061B2

(12) United States Patent
Rathke et al.

(10) Patent No.: US 12,083,061 B2
(45) Date of Patent: Sep. 10, 2024

(54) STRAP FOR SLING AND METHOD FOR MANUFACTURING SUCH A STRAP AND USE OF SUCH STRAP

(71) Applicant: V. GULDMANN A/S, Århus N (DK)

(72) Inventors: Morten Rathke, Sporup (DK); Jørgen Guldmann, Risskov (DK)

(73) Assignee: V. GULDMANN A/S, Århus N (DK)

( * ) Notice: Subject to any disclaimer, the term of this patent is extended or adjusted under 35 U.S.C. 154(b) by 956 days.

(21) Appl. No.: 17/046,045

(22) PCT Filed: Apr. 10, 2019

(86) PCT No.: PCT/DK2019/050114
§ 371 (c)(1),
(2) Date: Oct. 8, 2020

(87) PCT Pub. No.: WO2019/197000
PCT Pub. Date: Oct. 17, 2019

(65) Prior Publication Data

US 2021/0052452 A1 Feb. 25, 2021

(30) Foreign Application Priority Data

Apr. 11, 2018 (DK) ........................... PA 2018 70216

(51) Int. Cl.
*A61G 7/14* (2006.01)
*A61G 7/10* (2006.01)
(Continued)

(52) U.S. Cl.
CPC ......... *A61G 7/1051* (2013.01); *A61G 7/1013* (2013.01); *D03D 1/0094* (2013.01); *D03D 11/02* (2013.01); *D03D 15/54* (2021.01)

(58) Field of Classification Search
CPC .. A61G 7/1051; A61G 7/1013; A61G 7/1015; A61G 7/10; D03D 1/0094;
(Continued)

(56) References Cited

U.S. PATENT DOCUMENTS 2,067,684 A * 1/1937 Sachs ...................... A41F 9/002 112/423
2,408,839 A * 10/1946 George .................... D03D 1/08 139/384 A
(Continued)

FOREIGN PATENT DOCUMENTS

EP 0046911 A1 3/1982
EP 2305200 A2 4/2011
(Continued)

OTHER PUBLICATIONS

Understanding color mixing; Warp & weave; whole document. (Year: 2023).*
(Continued)

*Primary Examiner* — Robert H Muromoto, Jr.
(74) *Attorney, Agent, or Firm* — Schmeiser, Olsen & Watts, LLP

(57) ABSTRACT

A strap is provided, intended for a sling for persons, where the strap is elongated with short end edges and longer lateral edges and comprises a first belt and a second belt. Each belt includes an inside and an outside, where the insides are turned towards one another, and the outsides are turned away from one another. The first belt and the second belt include warps and wefts. The strap has a longitudinal direction that is parallel to the warps, and a transverse direction that is parallel to the wefts. In the longitudinal direction of the strap there are a number of first sections, where the first belt and the second belt are interwoven, and second sections are provided between them, where the first belt and the second
(Continued)

belt are not interwoven, so that an eye is formed in each of the second sections.

9 Claims, 24 Drawing Sheets

(51) Int. Cl.
*D03D 1/00* (2006.01)
*D03D 11/02* (2006.01)
*D03D 15/54* (2021.01)

(58) Field of Classification Search
CPC ...... D03D 11/02; D03D 15/54; D03D 1/0005; A62B 35/00
See application file for complete search history.

(56) References Cited

U.S. PATENT DOCUMENTS

| | | | | | | |
|---|---|---|---|---|---|---|
| 2,663,031 | A | * | 12/1953 | Kalthoff | A61G 7/1051 | 5/89.1 |
| 2,822,605 | A | * | 2/1958 | Parlin | D04B 21/20 | 112/475.08 |
| 3,009,232 | A | * | 11/1961 | Martin | D03D 3/00 | 428/116 |
| 3,288,174 | A | * | 11/1966 | Messer | D03D 49/36 | 139/161 S |
| 3,857,139 | A | * | 12/1974 | Turner | B65D 63/10 | 229/87.09 |
| 3,926,227 | A | * | 12/1975 | Takada | D03D 11/00 | 139/426 R |
| 4,209,044 | A | * | 6/1980 | Taki | D03D 11/00 | 139/411 |
| 4,723,323 | A | * | 2/1988 | Wright, Jr. | G09B 19/0076 | 2/244 |
| 4,834,439 | A | * | 5/1989 | van de Kamp | D03D 15/283 | 428/43 |
| 4,852,931 | A | * | 8/1989 | Ferdi | A63C 11/025 | 294/147 |
| 4,913,136 | A | * | 4/1990 | Chong | A61F 5/0193 | 602/24 |
| 5,082,157 | A | * | 1/1992 | Emerson-Santos | A45C 1/04 | 224/587 |
| 5,203,829 | A | * | 4/1993 | Fisk | A62B 35/0031 | 119/857 |
| 5,261,728 | A | * | 11/1993 | Carmichael | B60R 21/12 | 280/801.1 |
| 5,263,495 | A | * | 11/1993 | Butterfield | A61G 7/1023 | 5/89.1 |
| 5,503,620 | A | * | 4/1996 | Danzger | A61F 5/028 | 2/310 |
| 5,517,696 | A | * | 5/1996 | Krugler | A41D 27/20 | 2/919 |
| 5,564,476 | A | * | 10/1996 | Golz | D03D 15/56 | 428/36.1 |
| 5,697,329 | A | * | 12/1997 | Bell | A62B 35/00 | 119/857 |
| 5,931,304 | A | * | 8/1999 | Hammond | A61F 17/00 | 206/570 |
| 5,957,091 | A | * | 9/1999 | McDonald | A62B 35/0031 | 119/770 |
| 6,010,652 | A | * | 1/2000 | Yoshida | D03D 11/02 | 139/389 |
| 6,125,475 | A | * | 10/2000 | Taylor | A41F 3/00 | 2/326 |
| 6,165,148 | A | * | 12/2000 | Carr-Stock | A61F 5/0118 | 602/5 |
| 6,175,973 | B1 | * | 1/2001 | Hakamiun | A61G 7/1017 | 5/89.1 |
| 6,247,502 | B1 | * | 6/2001 | Ekelund | D03C 19/00 | 139/420 R |
| 6,289,534 | B1 | * | 9/2001 | Hakamiun | A61G 7/1067 | 5/89.1 |
| 6,298,944 | B1 | * | 10/2001 | Forbes | A45F 3/04 | 182/135 |
| 6,331,024 | B1 | * | 12/2001 | Gulley | B66C 1/18 | 294/74 |
| 6,390,143 | B1 | * | 5/2002 | Speich | D03C 19/00 | 139/232 R |
| 6,450,131 | B1 | * | 9/2002 | Broman | A61F 5/026 | 119/857 |
| 6,626,131 | B2 | * | 9/2003 | Moulton, III | A01K 27/00 | 119/770 |
| 6,824,346 | B2 | * | 11/2004 | Coblentz | B63B 27/16 | 414/803 |
| 7,017,207 | B2 | * | 3/2006 | Lauderman | D03D 1/00 | 5/482 |
| 7,257,847 | B2 | * | 8/2007 | Hart | A41B 9/001 | 2/408 |
| 7,300,410 | B1 | * | 11/2007 | Weber | A61F 5/3738 | 602/5 |
| 7,628,435 | B1 | * | 12/2009 | Golz | B66C 1/18 | 294/74 |
| 7,650,717 | B2 | * | 1/2010 | Drayer | D07B 1/148 | 47/42 |
| 7,942,242 | B1 | * | 5/2011 | O'Connor | A62B 1/14 | 182/7 |
| 8,177,025 | B2 | * | 5/2012 | Lang | A62B 35/0037 | 182/4 |
| 8,651,234 | B2 | * | 2/2014 | Yocco | A62B 35/0018 | 182/3 |
| 8,902,074 | B2 | * | 12/2014 | Landry | A62B 35/0018 | 280/808 |
| 8,905,451 | B1 | * | 12/2014 | Golz | A62B 3/00 | 5/624 |
| 9,328,436 | B2 | * | 5/2016 | Russell | A62B 35/0093 | |
| 9,693,919 | B2 | * | 7/2017 | Berman | A61G 7/1051 | |
| 10,172,736 | B1 | * | 1/2019 | Kayser | B62B 9/24 | |
| 10,814,149 | B2 | * | 10/2020 | Liggett | A62B 35/0075 | |
| 11,021,325 | B2 | * | 6/2021 | Doherty | A61F 5/3738 | |
| 11,441,250 | B2 | * | 9/2022 | Jiang | D04B 21/06 | |
| 2002/0092531 | A1 | * | 7/2002 | Chapman | E05B 75/00 | 128/869 |
| 2003/0160074 | A1 | * | 8/2003 | Pineda | A45F 5/02 | 223/81 |
| 2007/0114095 | A1 | * | 5/2007 | Swierski | A62B 35/0075 | 182/9 |
| 2009/0191777 | A1 | * | 7/2009 | Liao | D03D 13/004 | 264/103 |
| 2010/0057120 | A1 | * | 3/2010 | Kirkham | A61B 17/1322 | 606/203 |
| 2010/0082060 | A1 | * | 4/2010 | Avitable | A61H 9/0078 | 29/700 |
| 2010/0108176 | A1 | * | 5/2010 | Golz | D03D 11/00 | 139/409 |
| 2014/0273697 | A1 | * | 9/2014 | Russell | B64D 25/06 | 139/11 |
| 2016/0095777 | A1 | * | 4/2016 | Berman | A61G 7/1026 | 5/81.1 T |
| 2018/0049498 | A1 | * | 2/2018 | Koh | A41H 3/007 | |
| 2018/0288577 | A1 | * | 10/2018 | Will | H04W 4/029 | |
| 2019/0017885 | A1 | * | 1/2019 | Horter | D03D 25/005 | |
| 2021/0156055 | A1 | * | 5/2021 | Chen | D03D 13/004 | |

FOREIGN PATENT DOCUMENTS

| | | | | | |
|---|---|---|---|---|---|
| EP | 3 093 382 | A1 | | 11/2016 | |
| EP | 3162347 | A1 | | 5/2017 | |
| ES | 2597860 | A2 | | 1/2017 | |
| GB | 2435049 | A | * | 8/2007 | D03D 11/02 |
| GB | 2531913 | A | | 5/2016 | |
| WO | 2009/100737 | A1 | | 8/2009 | |

OTHER PUBLICATIONS

Color prediction of yarn dyed woven fabrics; Journal of the Korean society of clothing and textiles; whole document (Year: 2014).*
International Search Report for PCT/DK2019/050114 issued Oct. 22, 2019.

(56) References Cited

OTHER PUBLICATIONS

Written Opinion for PCT/DK2019/050114 issued Oct. 22, 2019.
Danish Search Report for Application PA 2018 70216 issued Oct. 16, 2018.

* cited by examiner

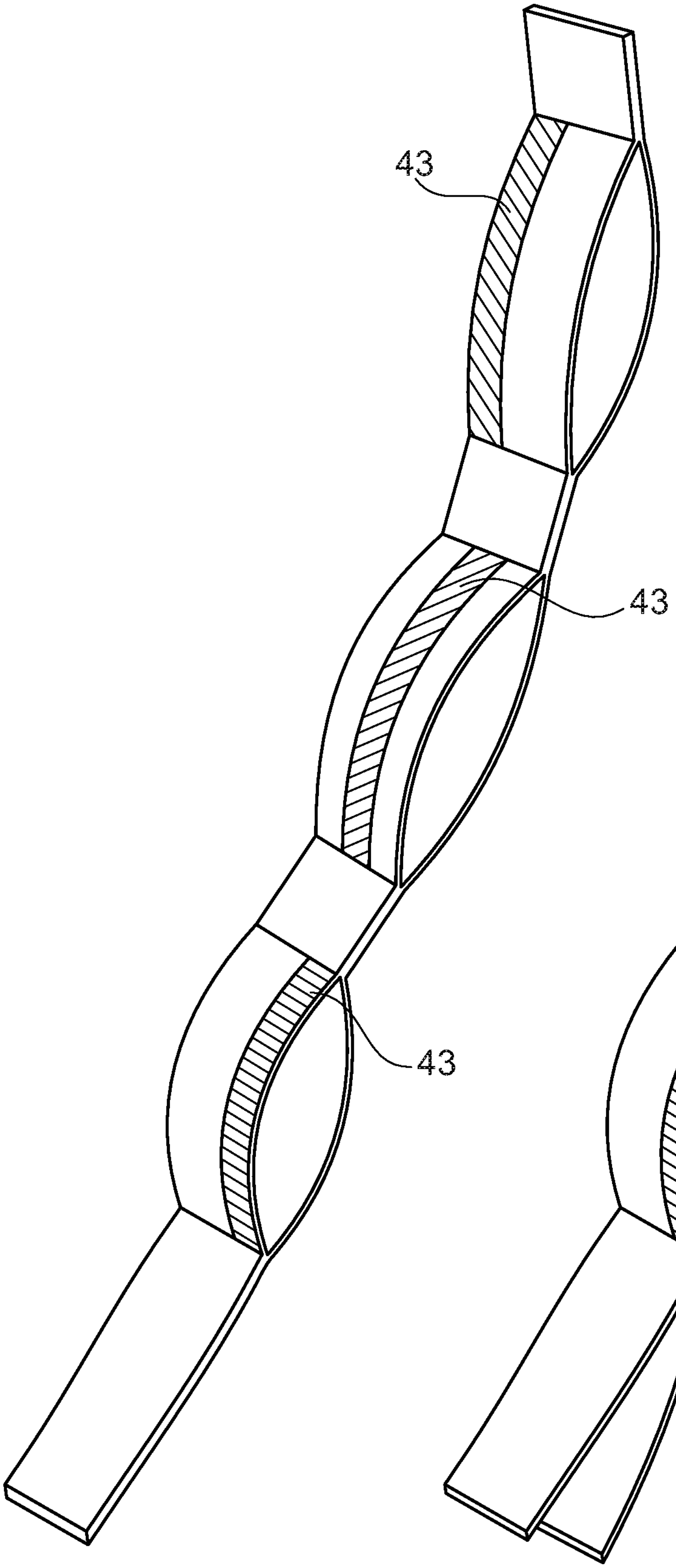
Fig. 11a
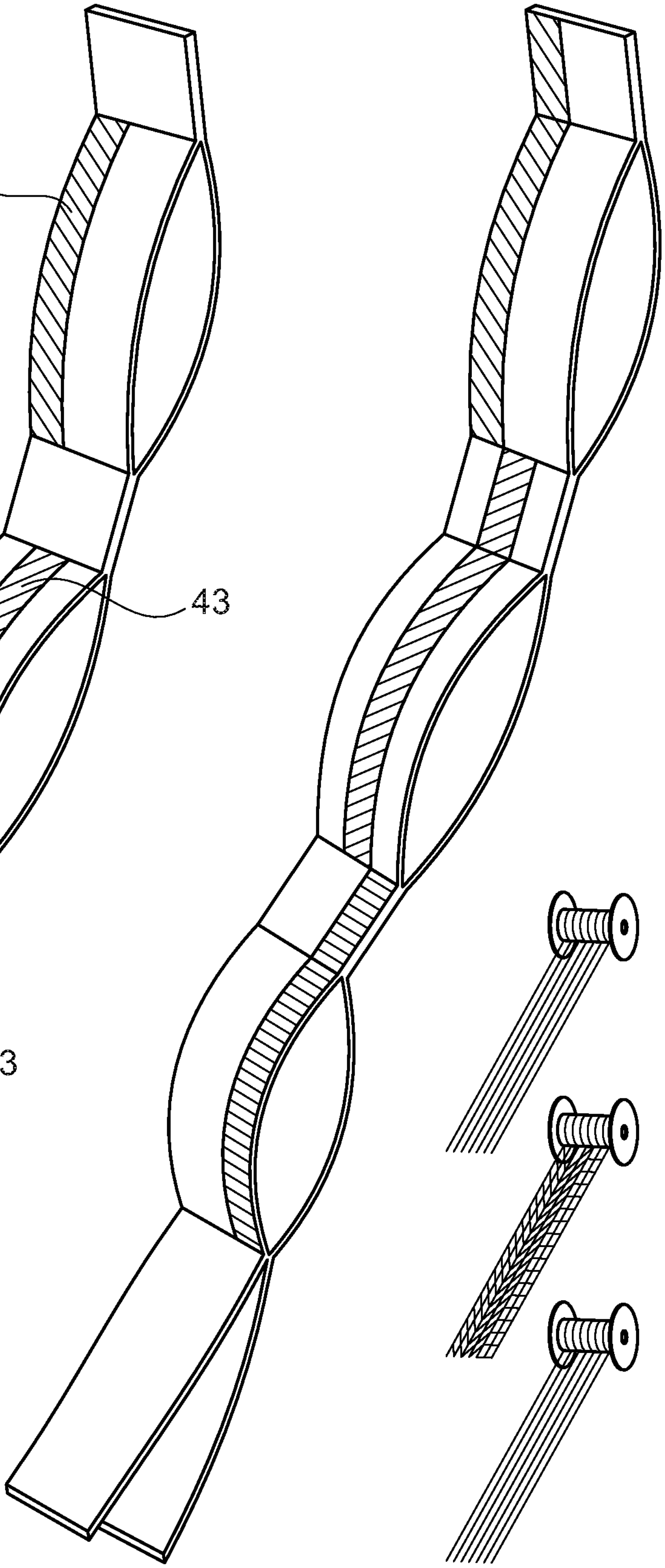
Fig. 11b
Fig. 11c

STRAP FOR SLING AND METHOD FOR MANUFACTURING SUCH A STRAP AND USE OF SUCH STRAP

CROSS-REFERENCE TO RELATED APPLICATIONS

This application claims priority to PCT Application No. PCT/DK2019/050114, having a filing date of Apr. 10, 2019, which is based DK Application No. PA 2018 70216, having a filing date of Apr. 11, 2018, the entire contents both of which are hereby incorporated by reference.

FIELD OF TECHNOLOGY

The following relates to a strap intended for a sling for persons, where the strap is elongated with short end edges and longer lateral edges and comprises a first belt and a second belt, where each belt comprises an inside and an outside, where the insides are turned towards one another, and the outsides are turned away from one another, where the first belt and the second belt comprise warps and wefts, where the strap has a longitudinal direction that is parallel to the warps, and a transverse direction that is parallel to the wefts, where in the longitudinal direction of the strap there are a number of first sections, where the first belt and the second belt are interwoven, and second sections are provided between them, where the first belt and the second belt are not interwoven, so that an eye is formed in each of the second sections, where in the longitudinal direction of the strap there is a sequence of colors and/or patterns, marking each eye in the strap unambiguously.

A further aspect is a method for producing a strap of this kind.

BACKGROUND

Personal slings are used for lifting persons in a great many situations, for example in hospitals, old people's homes and in-home care. The personal sling is put round the person who is to be lifted, as a rule by a personal hoist. Then the straps from the personal sling are hung in one or more hooks on the personal hoist, and the person is lifted with the hoist. In this way, transfer of a person who does not have the necessary strength for this can be carried out by a single caregiver.

Persons, surroundings, and hoists vary. Therefore, the straps of personal slings are as a rule made with several eyes along the strap, so that the sling can be hung in the hoist at various places along the strap. As a result, a sling with the same design and size can be used in many different situations and for persons of various sizes.

With pressure for greater efficiency in the health service, less time is allotted to the care personnel for the individual person. Therefore, it is important that the individual tasks can be carried out speedily and effectively. For this purpose, straps for personal slings have been developed with color coding on the straps. Work instructions can then be simplified to for example "use the blue one for lifting persons with the personal sling".

A strap of this kind with two belts, which form a multiple of eyes, where the eyes are marked with an unambiguous color on one side of the strap, is known from ES2597860.

This strap has several drawbacks.

Firstly, the first belt and the second belt are of different types. This means that the strap is difficult to handle in everyday use when it has to be fitted on hooks on the hoist.

Secondly, the fact that the first belt and the second belt are different means that the weakest place is in an eye, which limits the carrying capacity. Therefore, the carrying capacity of the strap may be limited at the secondary belt, which has lower carrying capacity than the primary belt.

Thirdly, the color markings are produced with differently colored weft. This results in a loose texture in the secondary belt to bring out the actual color of the weft. This means that the tensile strength in the interweaving between the secondary belt and the primary belt is weak and it may open, leading to breakage.

Fourthly, the eyes are only color-marked on one side of the strap. Therefore, the strap has to be turned so this marked side can be seen by the care personnel before it can be fitted in the hook on the hoist.

Finally, the straps cannot be visually inspected every time, when they are fitted, owing to the single-sided color marking of the strap.

SUMMARY

An aspect relates to supply a strap for personal slings, which overcomes these drawbacks.

One aspect of embodiments of the invention is to supply a strap that has a high carrying strength, and where the carrying strength is not limited by a weak link in the strap, and that makes possible an efficient procedure and simple identification of the eye that is to be used or is in use.

A further aspect of embodiments of the invention is to provide a method for producing a strap that overcomes the aforementioned drawbacks.

This is achieved according to embodiments of the present invention with a strap intended for a sling for persons, of the type mentioned at the outset, which has the distinctive features that it is elongated with short end edges and longer lateral edges and comprises a first belt and a second belt, where each belt comprises an inside and an outside, where the insides are turned towards one another, and the outsides are turned away from one another, where the first belt and the second belt comprise warps and wefts, where the strap has a longitudinal direction that is parallel to the warps, and a transverse direction that is parallel to the wefts, where in the longitudinal direction of the strap there are a number of first sections, where the first belt and the second belt are interwoven, and second sections are provided between them, where the first belt and the second belt are not interwoven, so that an eye is formed in each of the second sections, so that the warps are produced in at least three different colors, and so that the warps are led in two outer layers and at least one intermediate layer in each of the two belts, with optional colors in the individual layers, and so that in the longitudinal direction of the strap there is a sequence of colors and/or patterns, marking each eye in the strap unambiguously.

The outer layers in adjacent first sections of a second part, or parts of the adjacent first sections may be made in the same color as the second part.

The optional colors in the individual layers may be established over the whole width of the strap. The width of the strap is measured at right angles to the longitudinal direction of the strap.

The strap may comprise at least three eyes.

According to a further embodiment, a distinctive feature of the strap is that the outer layers on both outsides of the strap are produced in the same color and/or pattern in any section of the strap.

According to a further embodiment, a distinctive feature of the strap is that one color and/or one pattern is used only once in the second section of a strap. So that there is a sequence of colors and/or patterns, marking each eye in the strap unambiguously.

According to a further embodiment, a distinctive feature of the strap is that the first belt and the second belt are identical.

The belts may be approximately identical. Alternatively, the belts may be completely identical.

According to a further embodiment, a distinctive feature of the strap is that the first belt and the second belt comprise the same number of warps and wefts.

According to a further embodiment, a distinctive feature of the strap is that in each first section, where the first belt and the second belt are interwoven, the at least three layers of one belt may be freely arranged with the layers of the second belt.

According to a further embodiment, a distinctive feature of the strap is that only one color and/or one pattern is used in the second section of a strap, so that there is a sequence of colors and/or patterns characterizing each eye in the strap.

According to a further embodiment, a distinctive feature of the strap is that the strap comprises elastic threads at least in one part of the longitudinal direction of the strap.

According to a further embodiment, a distinctive feature of the strap is that the strap comprises an elastic element at least in one part of the longitudinal direction of the strap.

The elastic may therefore have the effect that at least in one part the strap contracts in the unloaded state. In the loaded state the elastics will give, until the threads counteract the load. Therefore, the strap is shorter in the unloaded state relative to the loaded state.

This is advantageous in particular with long straps. For example, if the sling is on a chair or a bed and is ready for use. The straps will thus not be in the way for the care personnel. In the unloaded state the straps are shorter than in the loaded state on account of the elastic threads or the elastic element. In the unloaded state the straps are not in contact with the floor and do not pick up dirt and are thus hygienic.

According to a further embodiment, a distinctive feature of the strap is that it is made as a tube in one part of the longitudinal direction of the strap and comprises elastic threads at least in one part of the longitudinal direction of the strap.

The tubular part is advantageous as it both protects the elastic and makes contraction of the strap easier in the unloaded state.

According to a further embodiment, a distinctive feature of the strap is that the colors and/or patterns on the outsides in each partial section consist of colored stripes in the longitudinal direction, where each colored stripe is established on only a part of the width of the strap in the transverse direction.

According to a further embodiment, a distinctive feature of the strap is that the colors and/or patterns on the outsides in each partial section are formed of only one warp with a color that comprises the whole partial section.

According to a further embodiment, a distinctive feature of the strap is that patterns are formed on the outsides in each partial section, said patterns being formed of several warps, for example two, each with its own color, and said patterns comprise the whole partial section.

According to a further embodiment, a distinctive feature of the strap is that the first belt and the second belt are displaced relative to one another in the transverse direction parallel to the wefts.

According to a further embodiment, a distinctive feature of the strap is that at one end edge the strap is connected to a third section, which is formed as an extension of the strap.

According to a further embodiment, a distinctive feature of the strap is that the strap and the third section are made with continuous warps.

According to a further embodiment, a distinctive feature of the strap is that the third section is made with interweaving of the longitudinal lateral edges of one of the two belts.

According to a further embodiment, a distinctive feature of the strap is that the third section is made with interweaving of the longitudinal lateral edges of the two belts, so that the third section is tubular.

According to a further embodiment, a distinctive feature of the strap is that the tubular third section comprises an elastic element.

According to a further embodiment, a distinctive feature of the strap is that the at least three layers of the first and second belt of the third section are interwoven in a different weaving width than the strap.

According to a further embodiment, a distinctive feature of the strap is that two straps at one end edge are connected together by a third section, which is formed as an extension of the two straps, and that the two straps and the third section are produced with continuous warps, and that the third section is made with interweaving of the longitudinal lateral edges of one of the two belts.

The straps are arranged oppositely oriented or laterally reversed.

The effect this produces is that the intermediate piece may be used for being sewn/joined on one edge of the sling. There is then formation of a fold, which comprises the edge of the sling. The intermediate piece may also be sewn/joined to the surface of the sling.

This gives a strong construction, which can withstand large loads, as the two straps and the intermediate piece form a continuous item. Thus, there are no seams or the like, which may constitute a weak point.

Moreover, with this strap it is possible to join the sling and intermediate piece together with an elongated seam along an edge and/or on the surface of the sling. In this way the forces are transmitted from the sling to the strap on a large area, which gives a durable construction.

Furthermore, the intermediate piece forms a durable edge on the sling, which protects against wear and soiling and increases the life of the sling.

The aforementioned designs will improve quality in sling production, where the individual components of the sling are traditionally joined together by sewing or other joining techniques. Any joint increases the risk of failure and subsequent breakage. In addition, the designs will be time-saving and will reduce the cost price per unit. The aforementioned advantages also apply to the designs given hereafter in the present patent application.

According to a further embodiment, a distinctive feature of the strap is that the colors and/or patterns on the outsides in each partial section consist of colored stripes in the longitudinal direction, where each colored stripe is established on only a part of the width of the strap in the transverse direction.

According to a further embodiment, a distinctive feature of the strap is that the colors on the outsides in each partial section are formed of only one warp with a color that comprises the whole partial section. Alternatively, patterns may be formed on the outsides in each partial section, which is formed of several warps, for example two, each with its own color, and said patterns comprise the whole partial section.

A further aspect of embodiments of the invention is a method for producing a strap intended for a sling for persons, said method comprising a step in which the strap produced is elongated with short end edges and longer lateral edges and comprises a first belt and a second belt, where the strap is produced with each belt comprising an inside and an outside, where the strap is produced with the insides turned towards one another, and the outsides turned away from one another, where the strap is produced with the first belt and the second belt comprising warps and wefts, where the strap is produced with a longitudinal direction that is parallel to the warps, and a transverse direction that is parallel to the wefts, where a number of first sections are formed in the longitudinal direction of the strap, where the first belt and the second belt are interwoven, and second sections are provided between them, where the first belt and the second belt are not interwoven, so that an eye is formed in each of the second sections, where the warps are produced in at least three different colors, where the warps are made of two outer layers and at least one intermediate layer in each of the two belts with optional colors in the individual layers, and where a sequence of colors and/or patterns, marking each eye in the strap unambiguously, is formed in the longitudinal direction of the strap.

A further aspect of embodiments of the invention is a method for producing a strap intended for a sling for persons, where the strap is produced with the outer layers on both outsides of the strap produced in the same color and/or pattern in any section of the strap.

A further aspect of embodiments of the invention is a method for producing a strap intended for a sling for persons, where one color and/or one pattern is used only once in the second section of a strap.

A further aspect of embodiments of the invention is a method for producing a strap intended for a sling for persons, where the strap is produced with the first belt and the second belt being identical.

A further aspect of embodiments of the invention is a method for producing a strap intended for a sling for persons, where the strap is produced with the first belt and the second belt comprising the same number of warps and wefts.

A further aspect of embodiments of the invention is a method for producing a strap intended for a sling for persons, where the strap is produced comprising elastic threads at least in one part of the longitudinal direction of the strap.

A further aspect of embodiments of the invention is a use of a strap, as described above, where the strap is used for lifting a sling for a person together with at least one further strap, as described above, and where the straps are fastened to a sling for persons.

The straps will be identical.

BRIEF DESCRIPTION

Some of the embodiments will be described in detail, with references to the following Figures, wherein like designations denote like members, wherein.

Figure 12A:
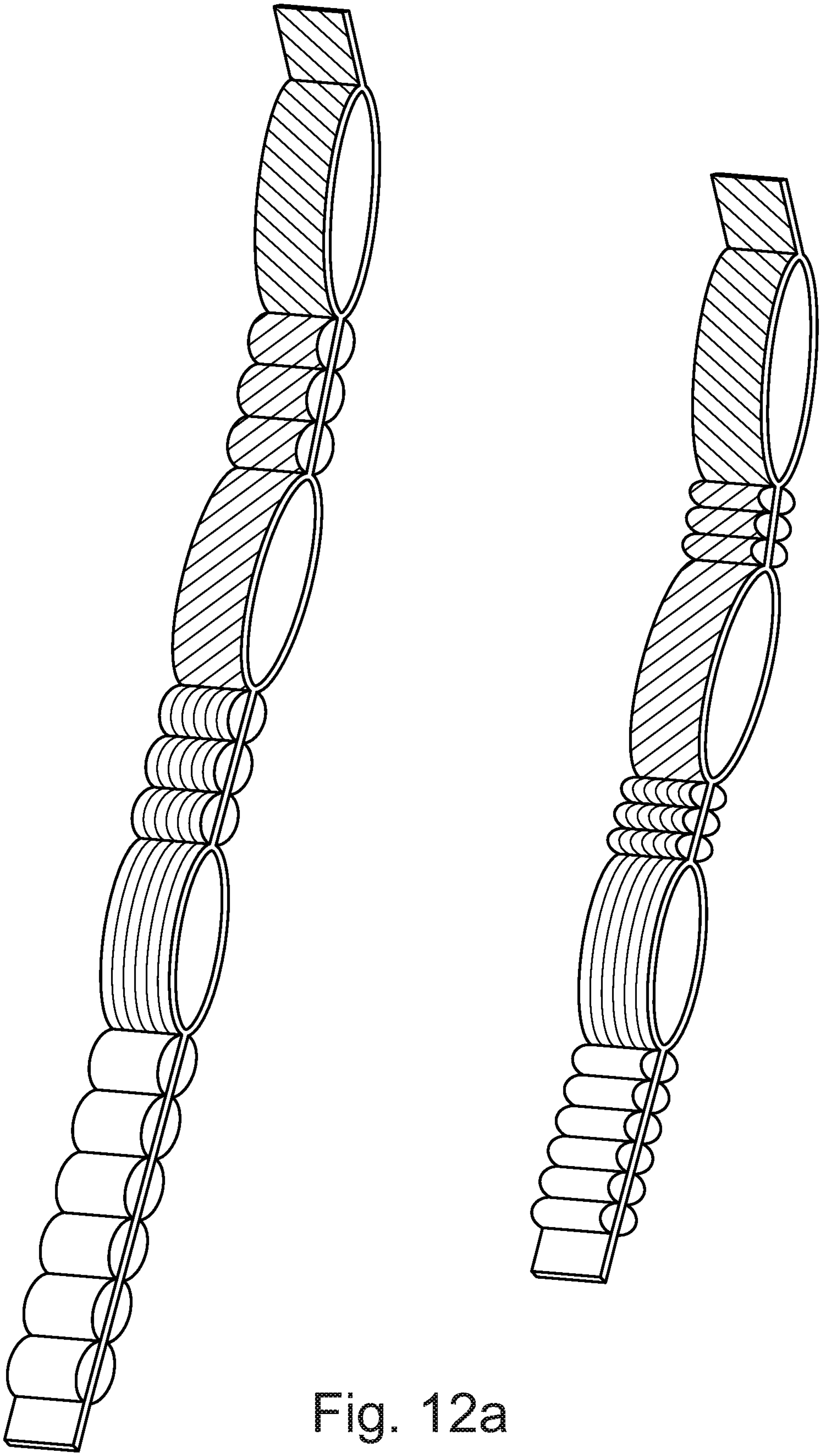
Figure 12B:
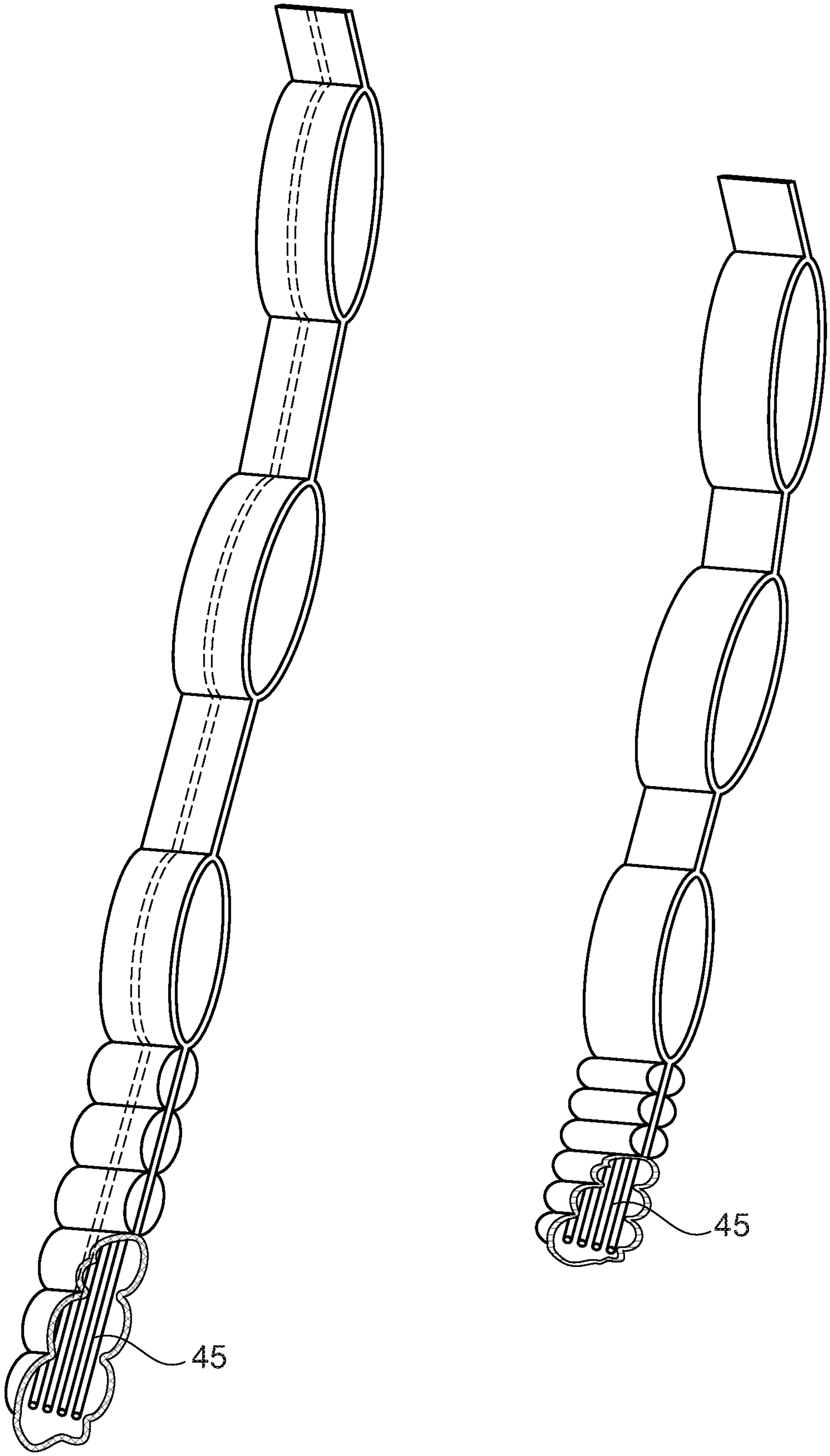
Figure 12C:
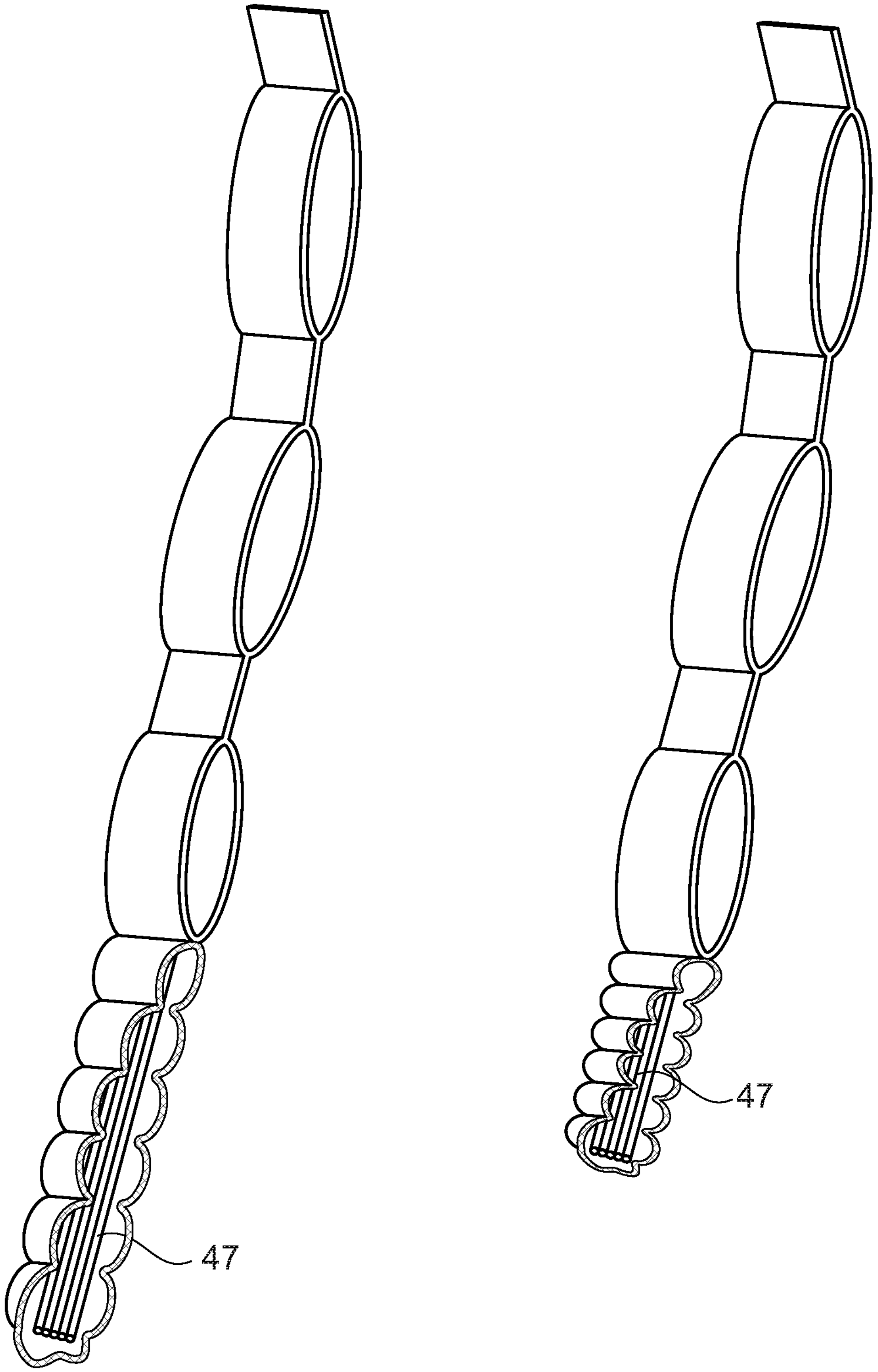
Figure 13A:
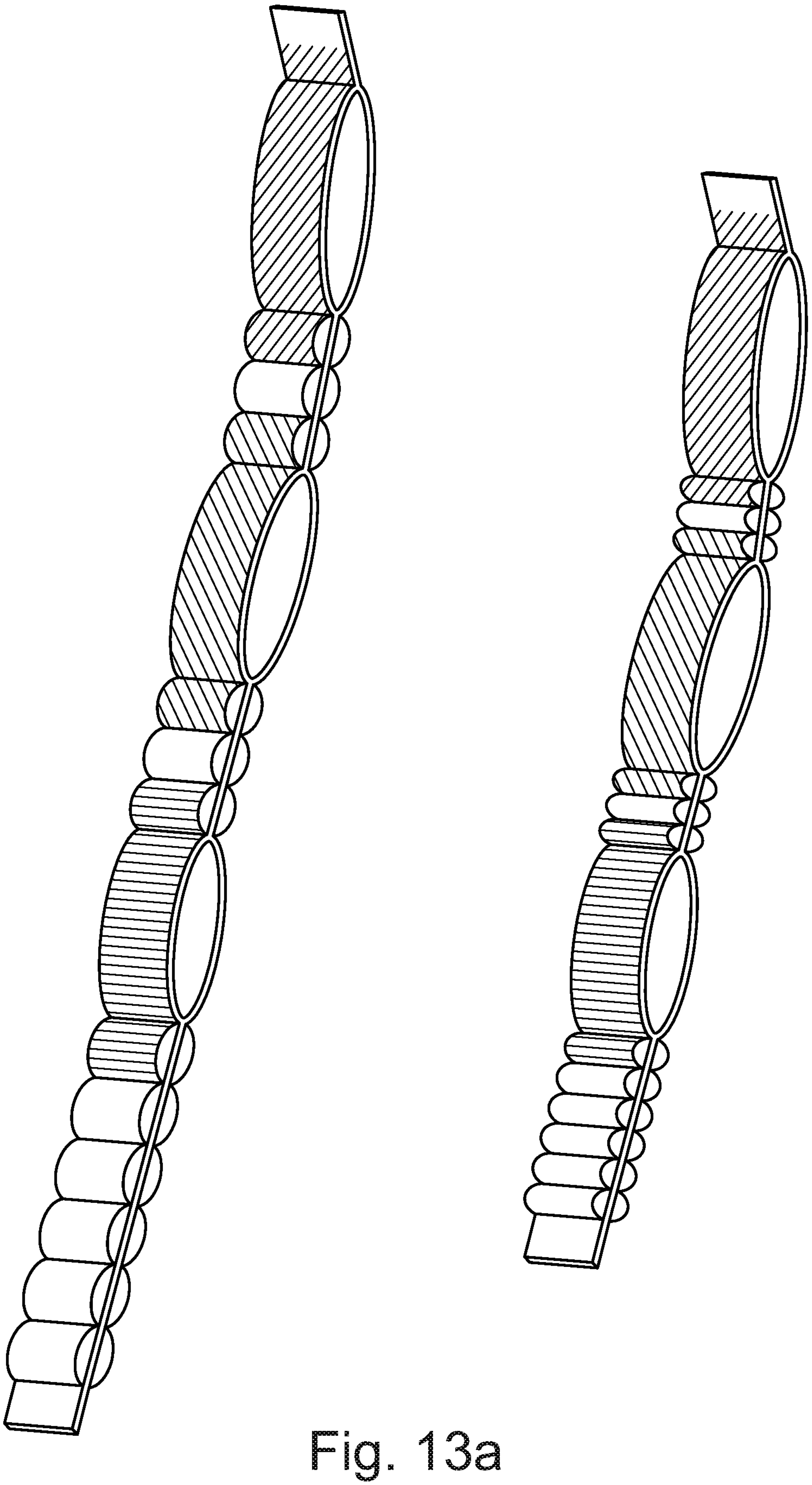
Figure 14:
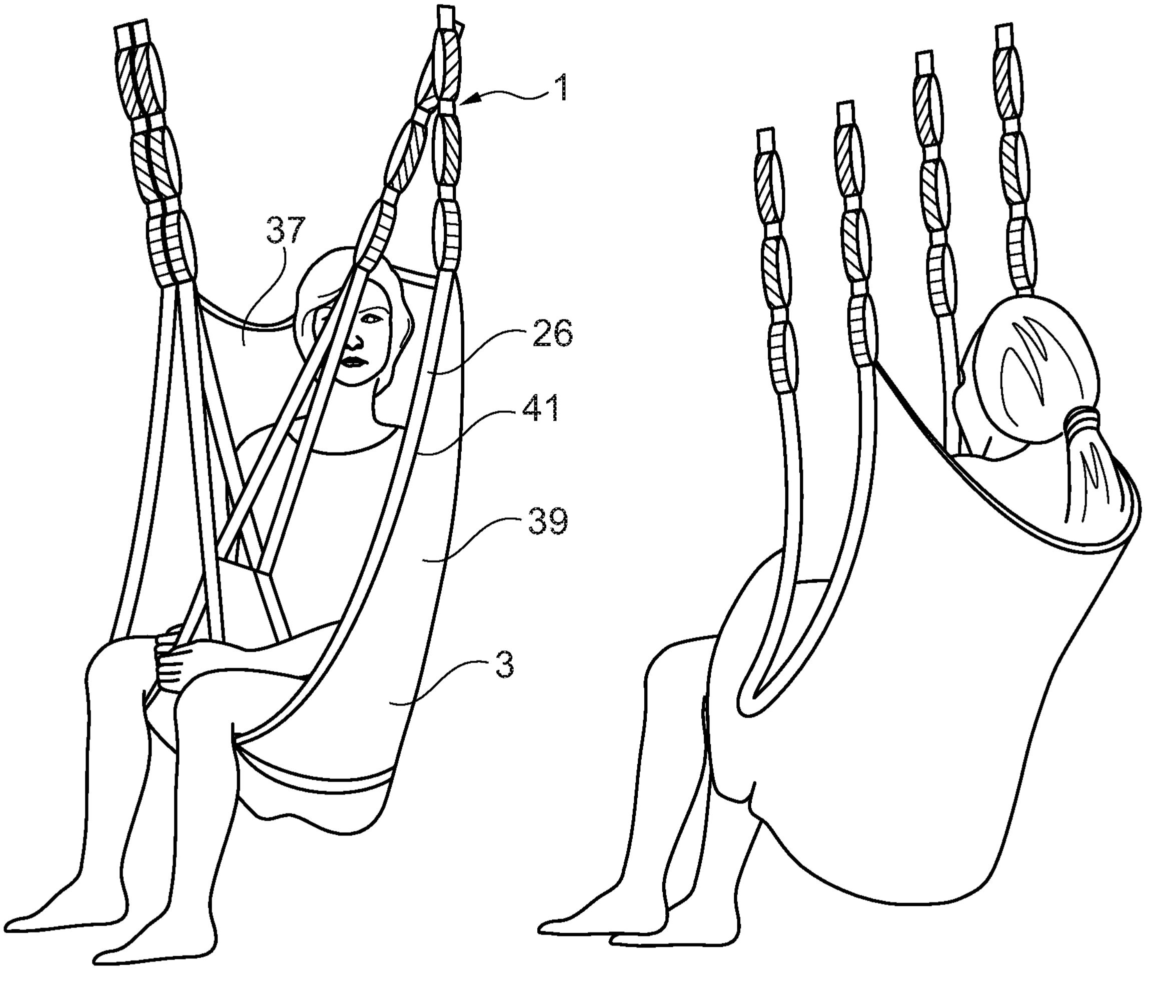
Figure 15A:
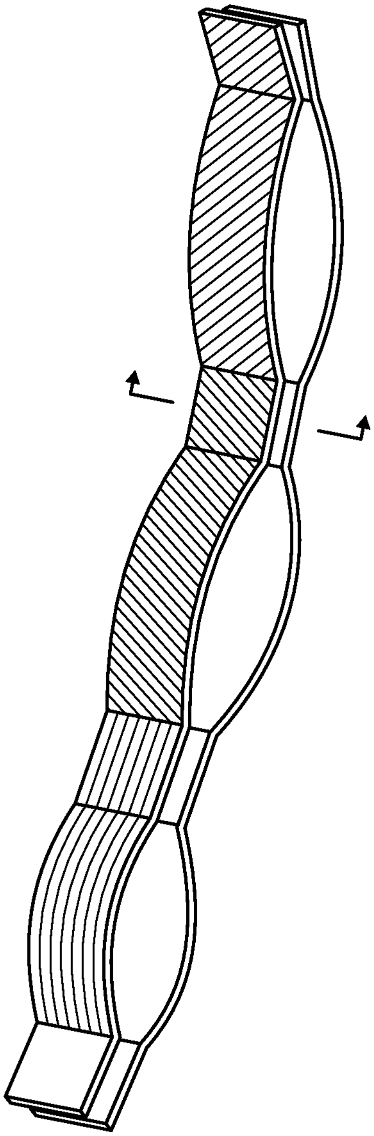
Figure 15B:
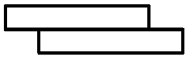
Figure 16:
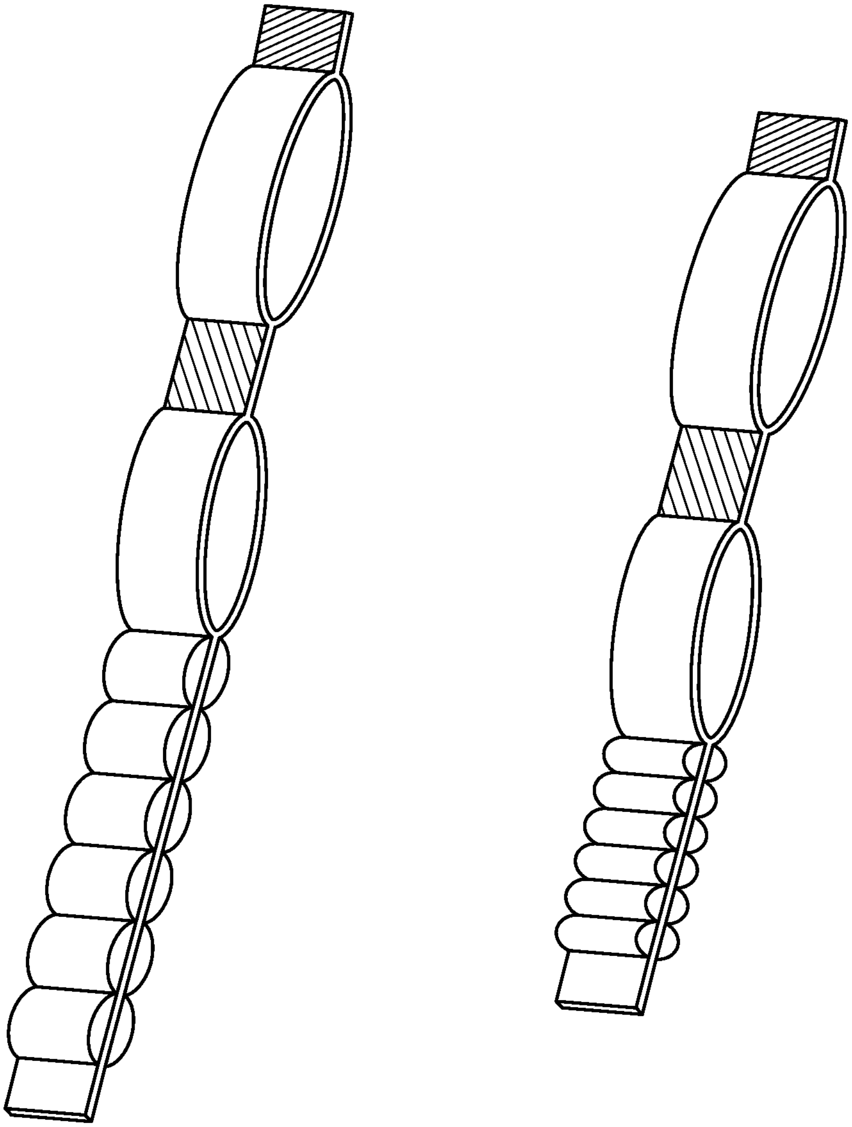
Figure 18:
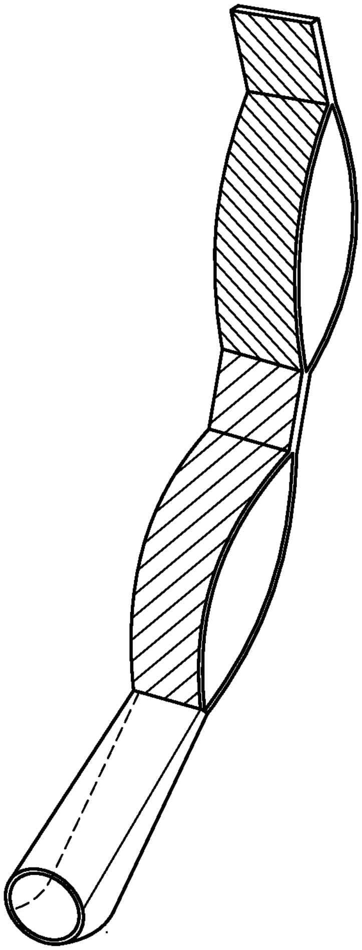
Figure 17:
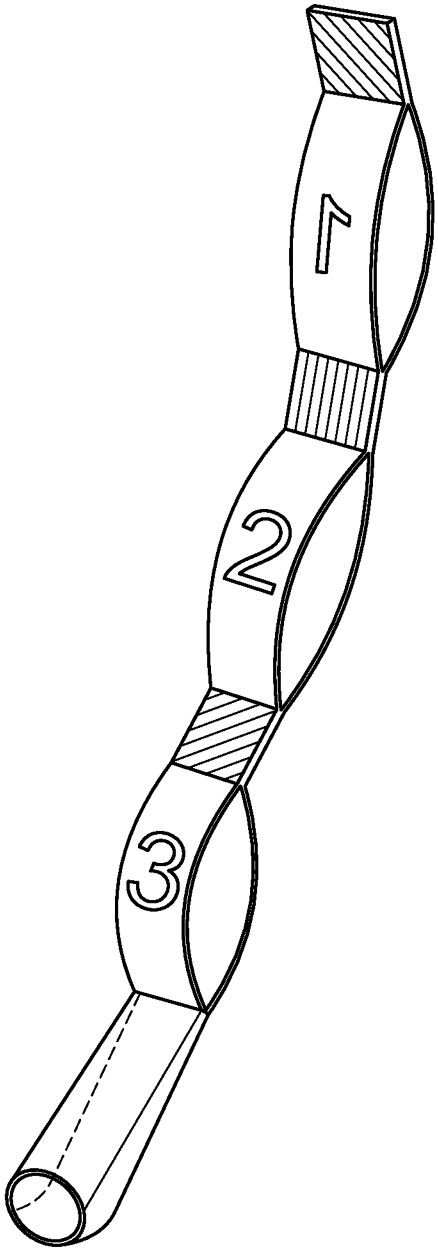
Figure 19:
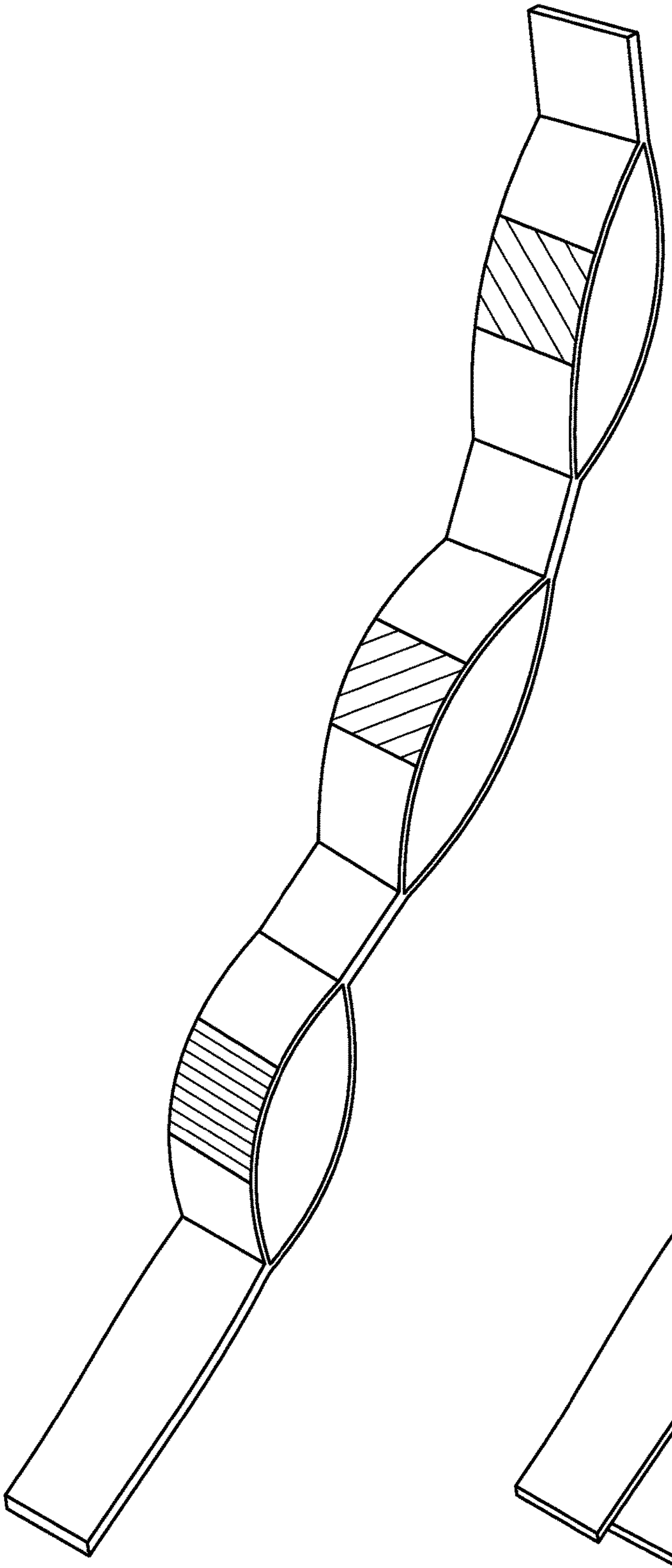
Figure 20:
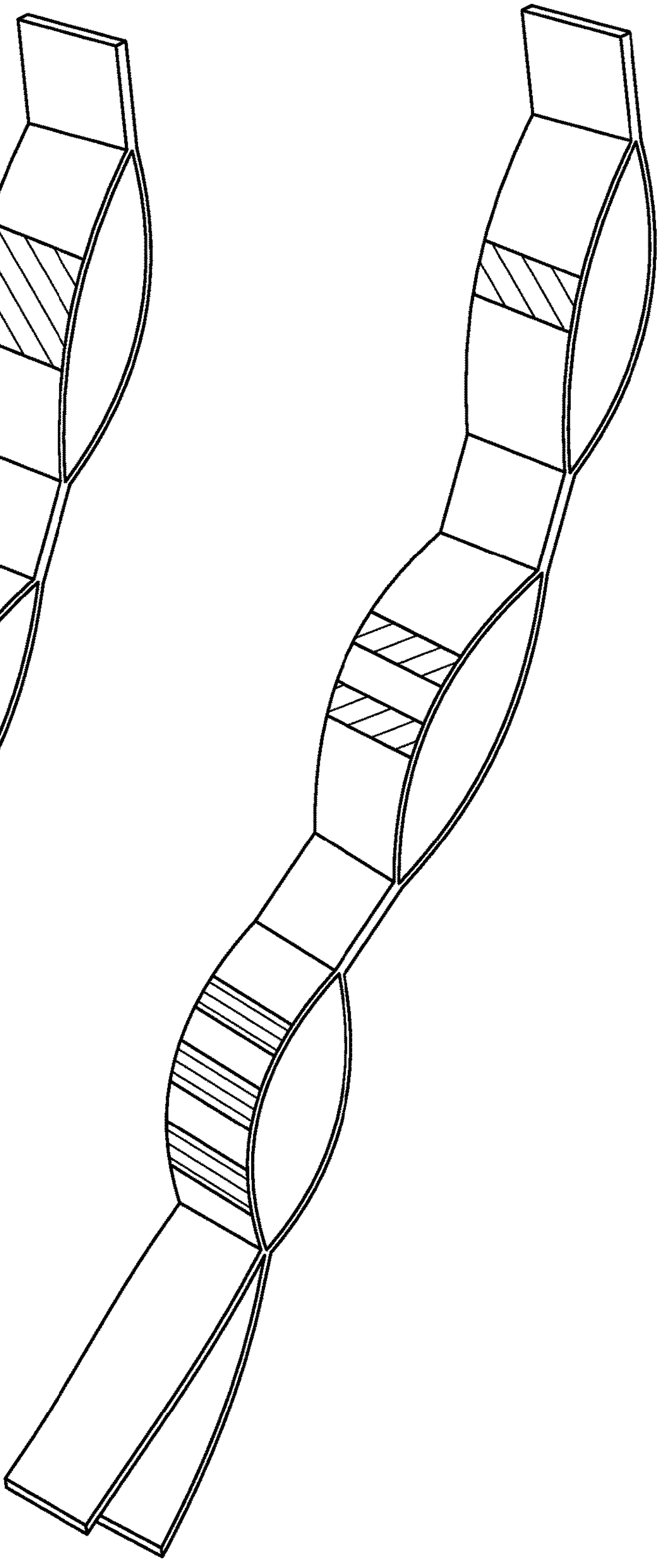
Figure 21:
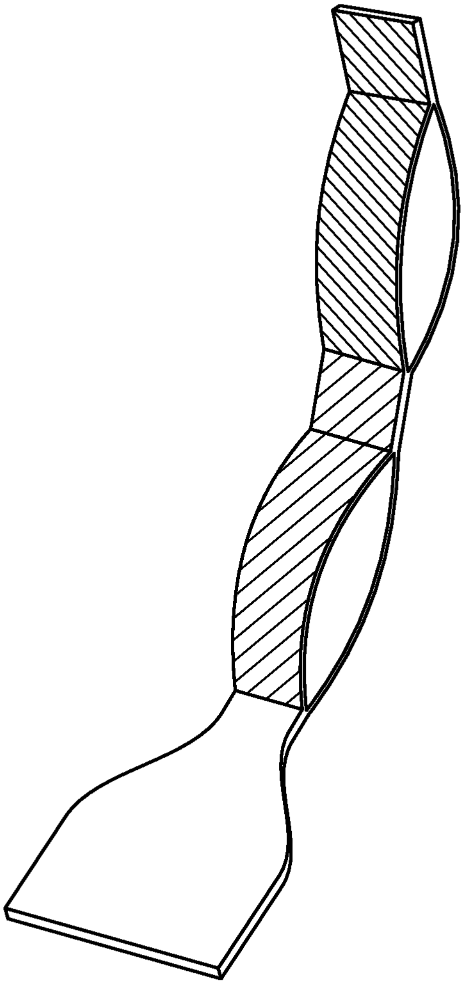
Figure 22:
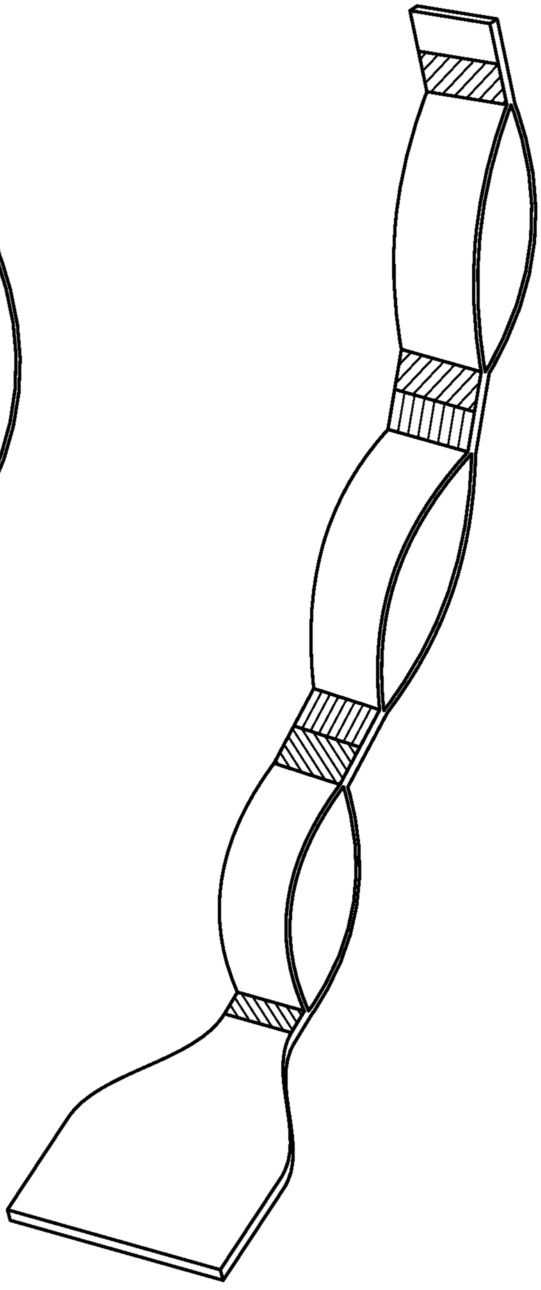
Figure 23:
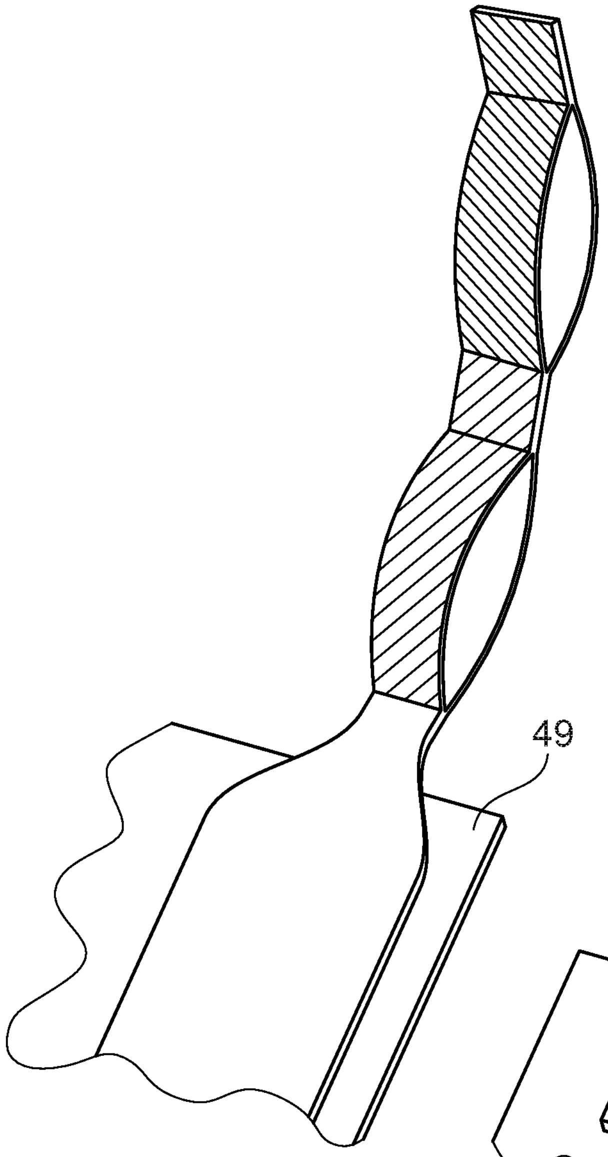
Figure 24:
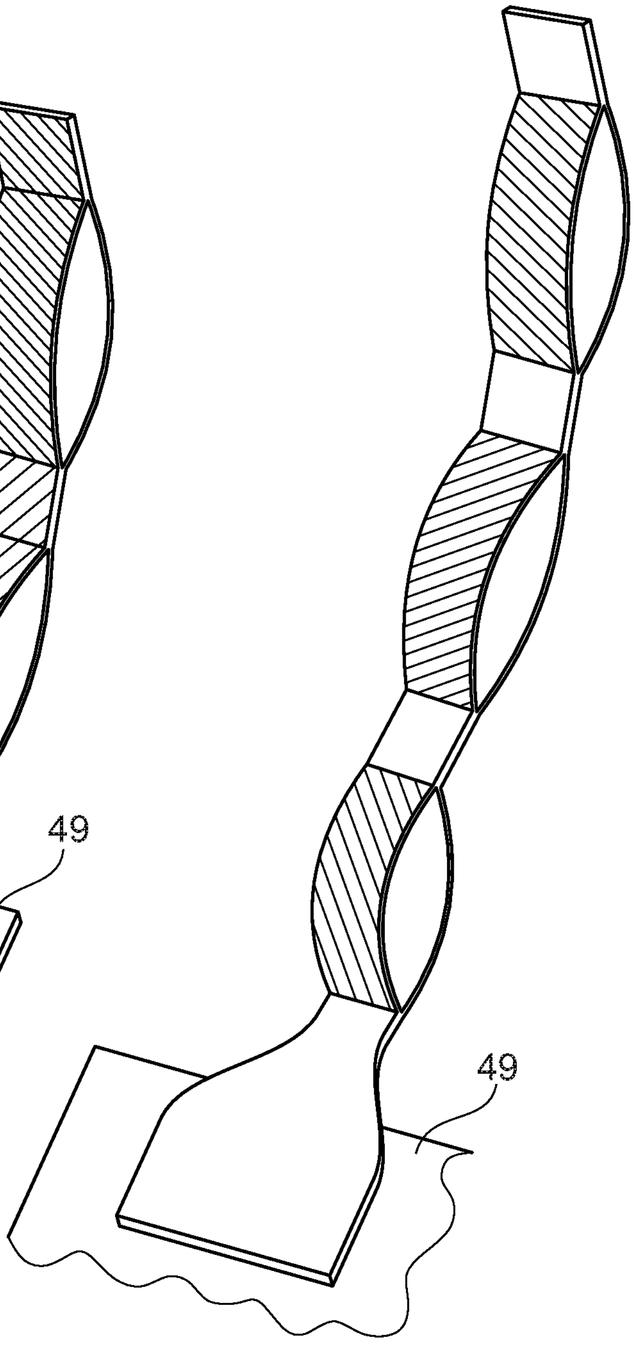
Figure 25:
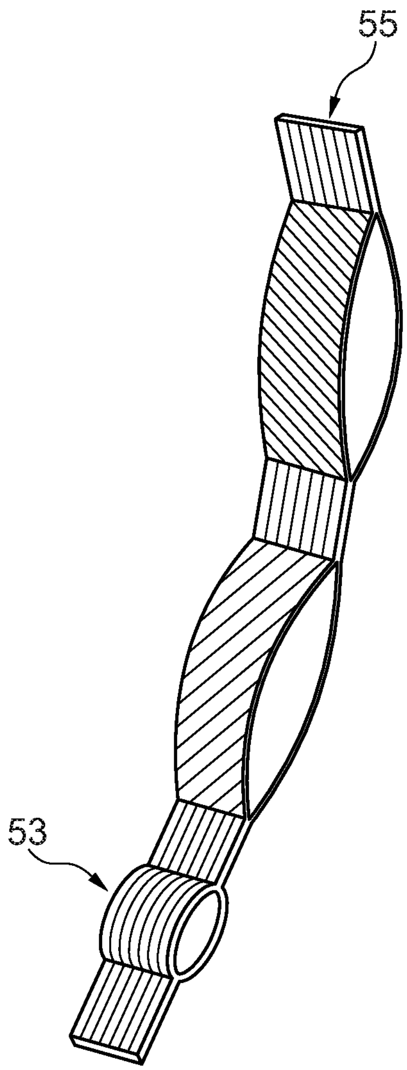
Figure 26:
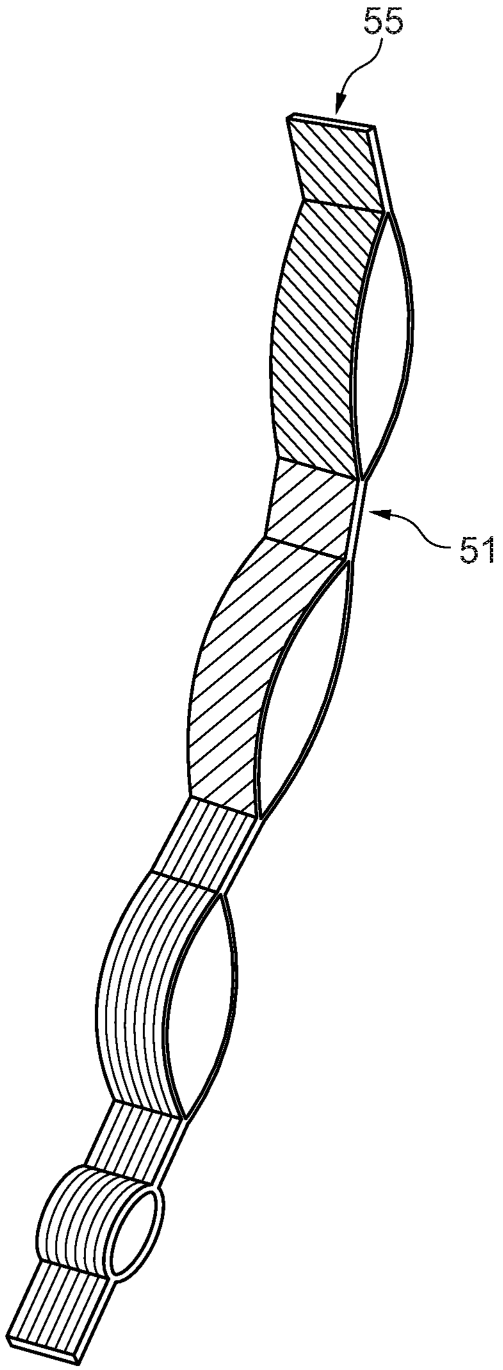
Figure 27:
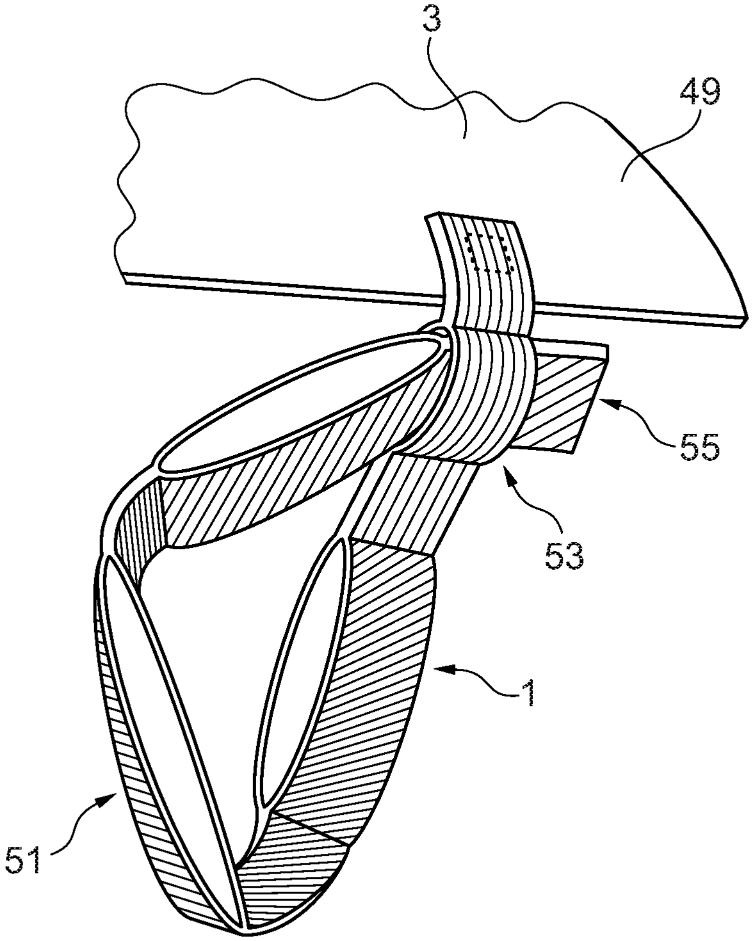
Figures 28, 29:
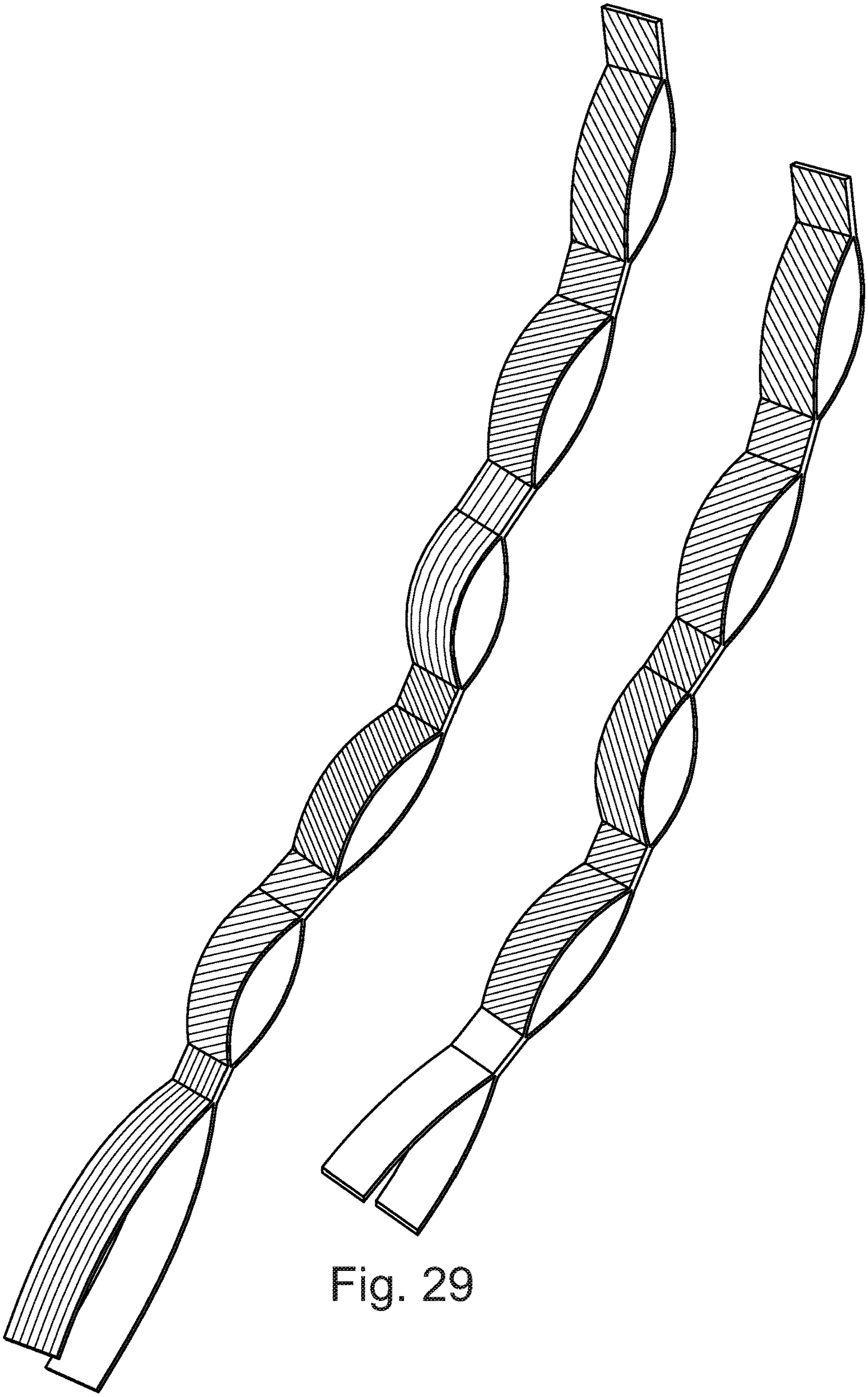
Figure 30:
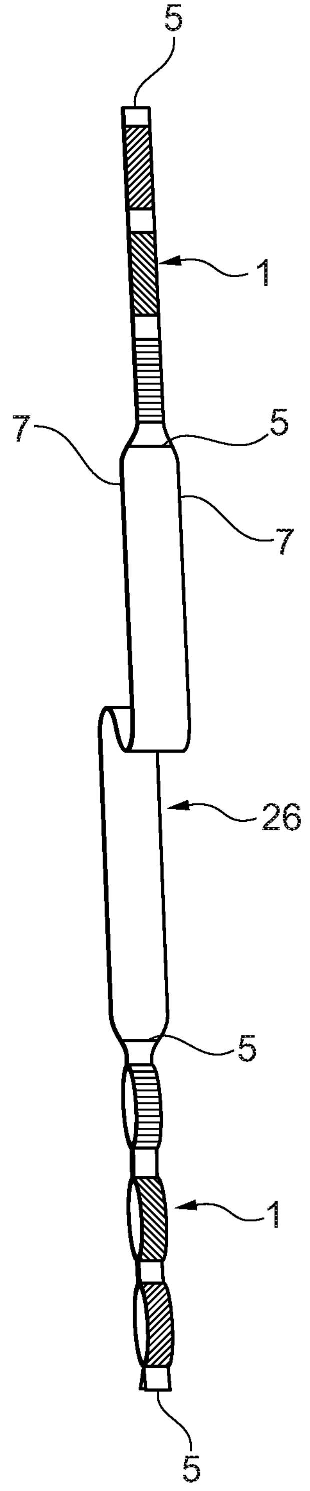
Figure 31:
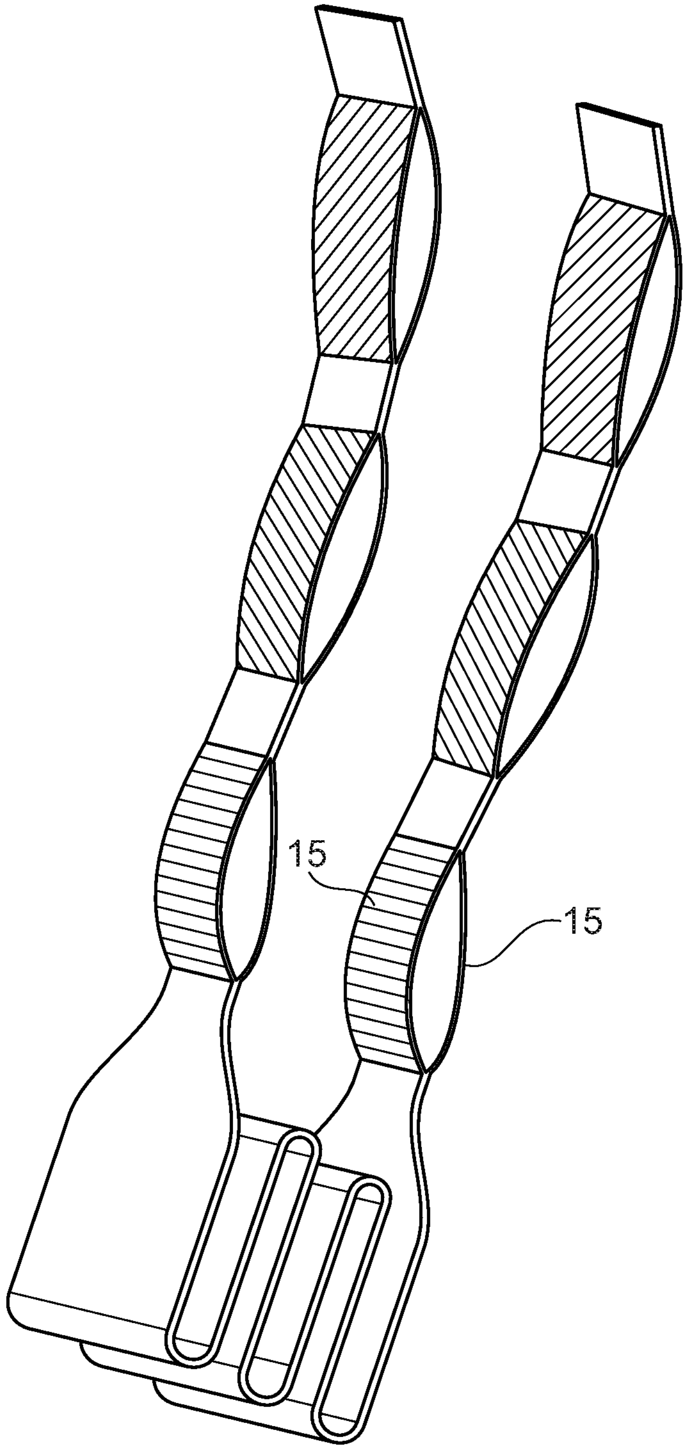

FIG. 11*a* shows a perspective view of a strap according to embodiments of the invention with colored stripes;

FIG. 11*b* shows straps according to embodiments of the invention;

FIG. 11*c* shows schematically how these stripes are formed by warp of different colors;

FIG. 11 *d* shows a strap where the colors and/or patterns 33 on the outsides are established over the whole width of the strap in the transverse direction;

FIG. 11 *e* shows a strap where the colors and/or patterns 33 on the outsides are established on only a part of the width of the strap in the transverse direction;

FIG. 12*a* shows a strap according to embodiments of the invention with elastic threads seen in the loaded and the unloaded state;

FIG. 12*b* shows sketches of a strap according to embodiments of the invention;

FIG. 12*c* shows a strap according to embodiments of the invention with an elastic element seen in the loaded and the unloaded state;

FIG. 13*a* shows a strap according to embodiments of the invention with elastic threads seen in the loaded and the unloaded state;

FIG. 13 *b* shows comprise a second section and a part of the adjacent first sections where marking of colors and/or patterns is omitted for clarity;

FIG. 14 shows a person in a sling with straps according to embodiments of the invention;

FIG. 15*a* shows a strap according to embodiments of the invention with displaced belts;

FIG. 15*b* shows a cross-section through the strap in one of the first sections of the strap;

FIG. 16 shows a strap according to embodiments of the invention;

FIG. 17 shows a strap according to embodiments of the invention with a tubular third section;

FIG. 18 shows a strap according to embodiments of the invention with a tubular third section;

FIG. 19 shows a strap according to embodiments of the invention;

FIG. 20 shows a strap according to embodiments of the invention;

FIG. 21 shows a strap according to embodiments of the invention with a wider third section;

FIG. 22 shows a strap according to embodiments of the invention with a wider third section;

FIG. 23 shows a strap according to embodiments of the invention with a wider third section fastened to a sling;

FIG. 24 shows a strap according to embodiments of the invention with a wider third section fastened to a sling;

FIG. 25 shows a strap according to embodiments of the invention with an extra eye for receiving the free end of the strap;

FIG. 26 shows a strap according to embodiments of the invention with an extra eye for receiving the free end of the strap;

FIG. 27 shows a strap according to embodiments of the invention with the free end of the strap inserted in an extra eye;

FIG. 28 shows a strap according to embodiments of the invention, where the first belt and the second belt are not interwoven in the section of the strap that is fastened to the sling;

FIG. 29 shows a strap according to embodiments of the invention, where the first belt and the second belt are not interwoven in the section of the strap that is fastened to the sling;

FIG. 30 shows a perspective view of straps according to embodiments of the invention joined together with an intermediate piece; and FIG. 31 shows a perspective view of straps according to embodiments of the invention joined together with an intermediate piece.

LIST OF REFERENCE SYMBOLS

1. Strap
3. Sling
5. End edge
7. Lateral edge
9. First belt
11. Second belt
13. Inside
15. Outside
17. Warp
19. Weft
21. Longitudinal direction
22. Transverse direction
23. First section
25. Second section
26. Third section
27. Eye
29. Outer layer
31. Intermediate layer
33. Color and/or pattern
37. One side of sling
39. Other side of sling
41. Edge of sling
43. Colored stripe
45. Elastic threads
47. Elastic element
49. Section of sling
51. Projecting part of the strap
53. Extra eye of the strap
55. Free end of the strap

DETAILED DESCRIPTION

Unless described otherwise, differently hatched areas in the figures will characterize different colors and/or patterns 33.

Figure 1:
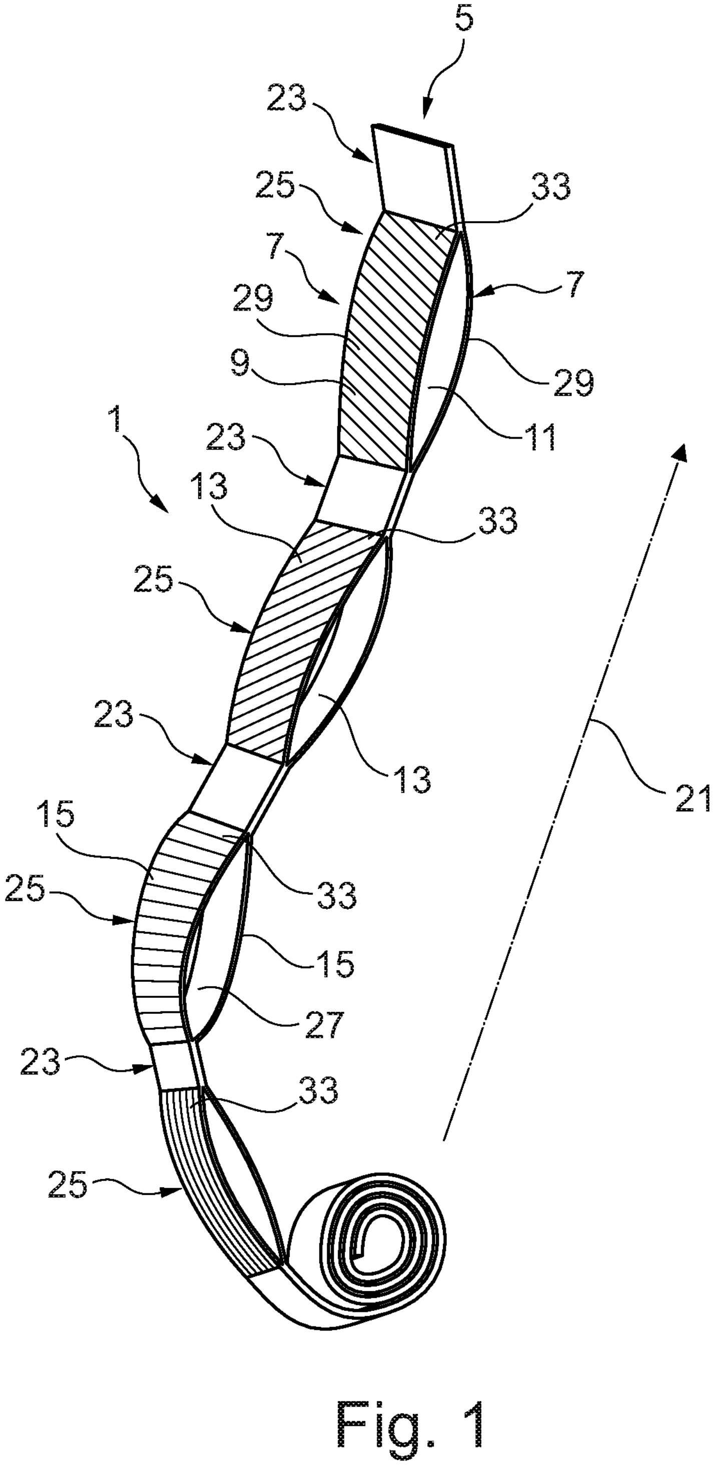
FIG. 1 shows a perspective view of a strap according to embodiments of the invention.
Figure 2:
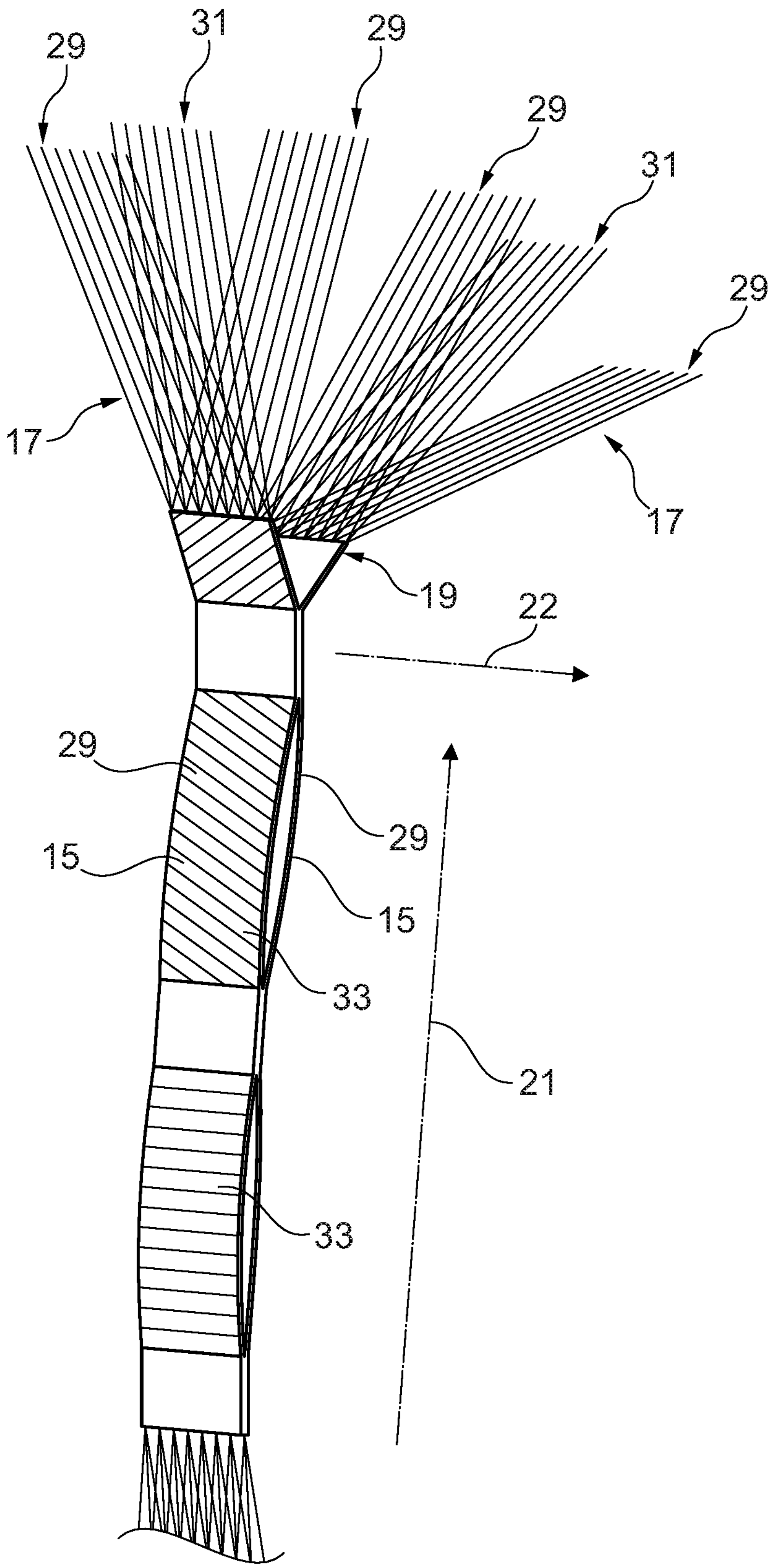
FIG. 2 shows a perspective view of a strap according to embodiments of the invention.

FIG. 1 shows a strap 1 for a sling (not shown) for persons according to embodiments of the invention. The strap 1 is elongated with short end edges 5 and longer lateral edges 7 and comprises a first belt 9 and a second belt 11. The first belt and the second belt are identical. Each belt comprises an inside 13 and an outside 15, where the insides 13 are turned towards one another, and the outsides 15 are turned away from one another, where the first belt 9 and the second belt 11 comprise warps and wefts. The strap has a longitudinal direction 21, which is parallel to the warps, and a transverse direction that is parallel to the wefts. In the longitudinal direction of the strap there are a number of first sections 23, where the first belt 9 and the second belt 11 are interwoven, and second sections 25 are provided between them, where the first belt and the second belt are not interwoven. An eye is formed in each of the second sections 25. The hatched areas indicate different colors and/or patterns 33. The color and/or pattern is identical on each of the outsides of the strap. The strap is rolled up at one end. The outer layers 29 on both outsides 15 of the strap 1 are produced in the same color and/or pattern 33 in any section of the strap. One color and/or one pattern 33 is used once in the second section of a strap 25, so that there is a sequence of colors and/or patterns, which clearly mark each eye 27 in the strap. FIG. 2 shows a sketch of the design and production of a strap according to embodiments of the invention. The warp can be seen, led in two outer layers 29 and an intermediate layer 31 for each belt.

The warps 17 are produced in at least three different colors (not shown) with optional colors in the individual layers. The outer layers 29 on both outsides 15 of the strap 1 are produced in the same color and/or pattern 33 in any section of the strap, and one color and/or one pattern is used only once in the second section of a strap, so that there is a sequence of colors and/or patterns, marking each eye in the strap unambiguously.

Figure 3:
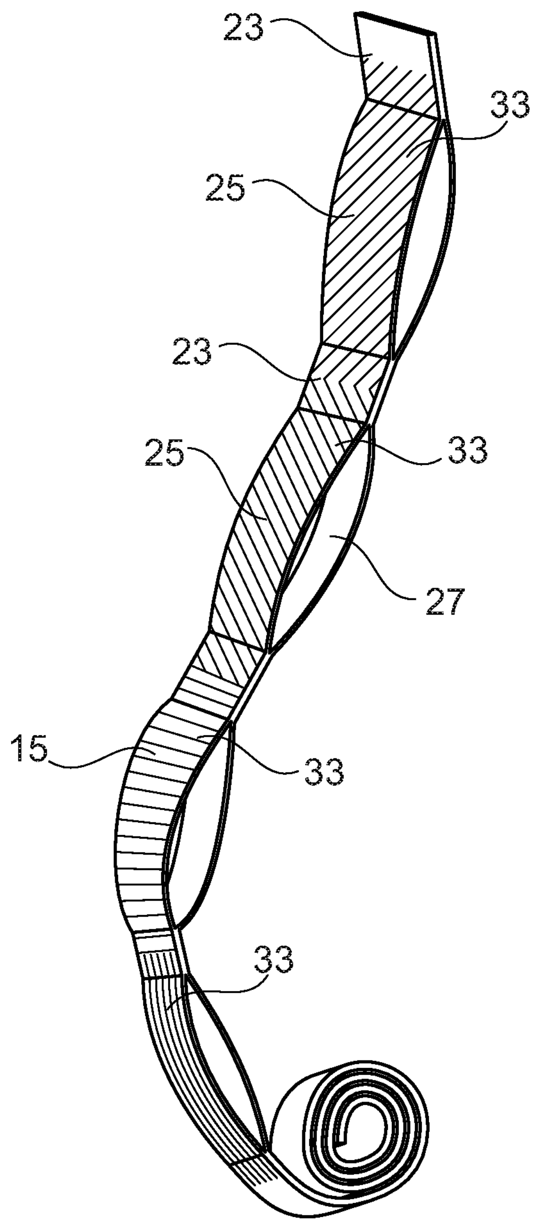
FIG. 3 shows a perspective view of a strap according to embodiments of the invention.

FIG. 3 shows a sketch of a strap 1 according to embodiments of the invention. It shows an alternative design of sequences of colors and/or patterns that clearly mark each eye 27 in the strap. Each color and/or pattern 33 is only used for one second section 25 in the strap. Some adjacent first sections 23 of each second section 25 are produced with the same color and/or pattern as the first section 25. The colors 33 on the outsides 15 in each partial section are formed of only one warp with a color that comprises the whole partial section or are formed as patterns 33 on the outsides 15 in each partial section, said patterns being formed of several warps, for example two, each with its own color, and said patterns comprise the whole partial section.

Figure 4:
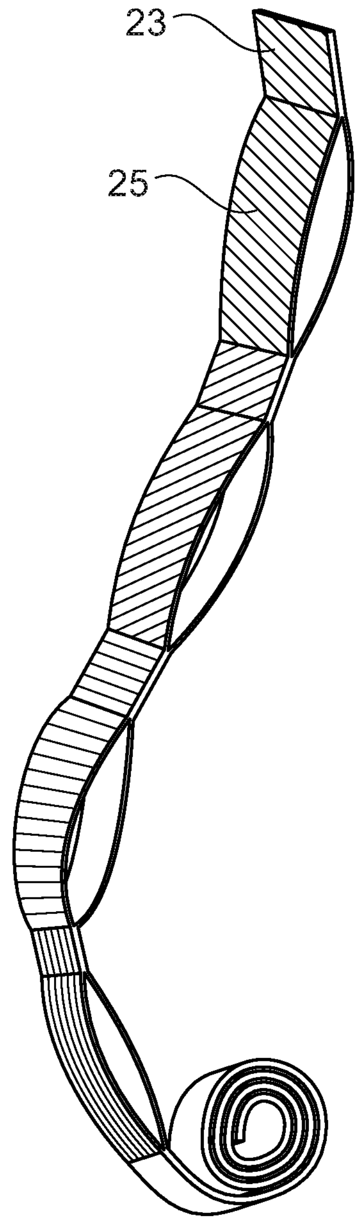
FIG. 4 shows a perspective view of a strap according to embodiments of the invention.

FIG. 4 shows a sketch of a strap 1 according to embodiments of the invention. It shows an alternative design of sequences of colors and/or patterns, which clearly mark each eye 27 in the strap. Each color and/or pattern 33 is only used for one second section 25 in the strap. One of the adjacent first sections 23 of each second section 25 is produced with the same color and/or pattern as the first section 25.

Figures 5, 6, 7, 8:
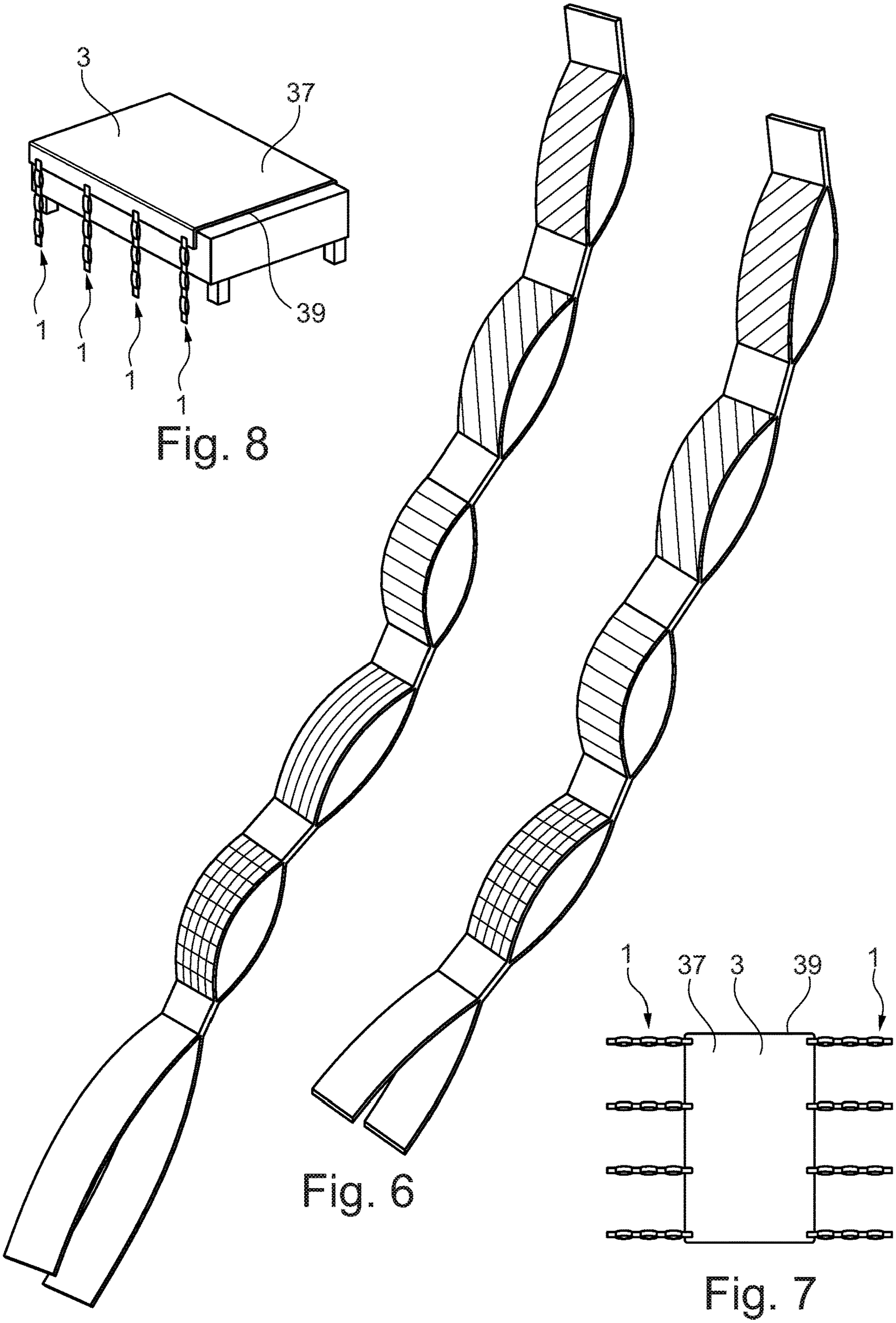
FIG. 5 shows a perspective view of a strap according to embodiments of the invention with five eyes.
FIG. 6 shows a perspective view of a strap according to embodiments of the invention with four eyes.
FIG. 7 shows a top view of straps according to embodiments of the invention fastened to a sling.
FIG. 8 shows a perspective view of straps according to embodiments of the invention fastened to a sling, which is applied on a bed.

FIG. 5 shows a sketch of a strap 1 according to embodiments of the invention with five eyes 27, where an end edge 5 of the strap consists of a section, where the first belt 9 and the second belt 11 are not interwoven. This embodiment is particularly suitable for fastening the strap on the sling (not shown), where the strap will not be sewn along the edge of the sling. Thus, one belt may be placed on one side of the sling, and the other belt placed on the other end of the sling, and the seam goes through both belts and the sling.

FIG. 6 shows a sketch of a strap 1 according to embodiments of the invention, as described in FIG. 5, with four eyes 27.

FIG. 7 shows straps 1 according to embodiments of the invention fastened to a sling 3. The straps may be sewn on the sling on only one side 37 of the sling with a single belt, or they may be sewn on both sides of the sling with the first belt 9 on one side 37 and the second belt 11 on the other side 39 of the sling.

FIG. 8 shows the sling 3 with straps 1, which is shown in FIG. 7, placed on a bed. The straps may be sewn on the sling on only one side 37 of the sling with a single belt, or they may be sewn on both sides of the sling with the first belt 9 on one side 37 and the second belt 11 on the other side 39 of the sling.

Figure 9:
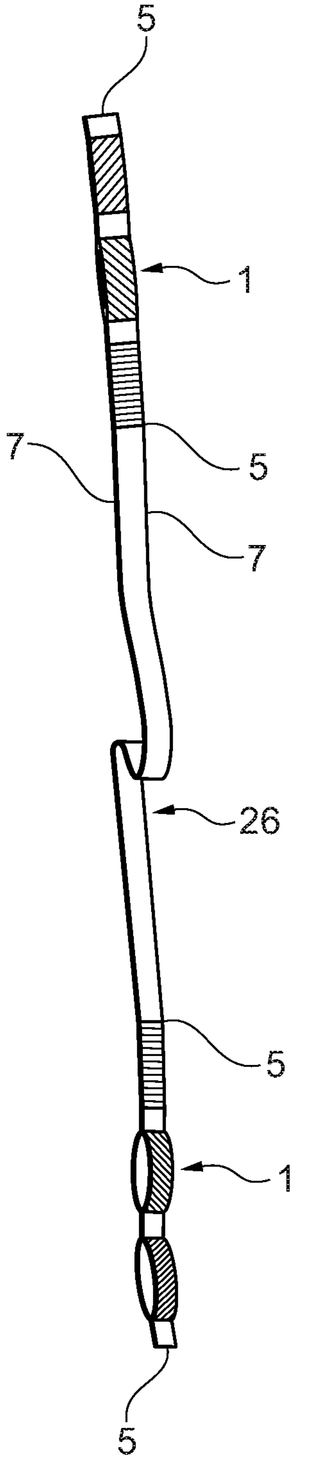
FIG. 9 shows a perspective view of straps according to embodiments of the invention joined together with an intermediate piece.

FIG. 9 shows two straps 1, which at one end edge 5 are joined together by a third section 26, which is formed as an extension of the two straps 1. The two straps 1 and the third section 26 are produced with continuous warps (not shown), and the third section 26 is produced with interweaving of the longitudinal lateral edges of one of the two belts 7. The two straps are assembled oppositely oriented, i.e. laterally reversed. This can be seen from the color markings.

Figure 10:
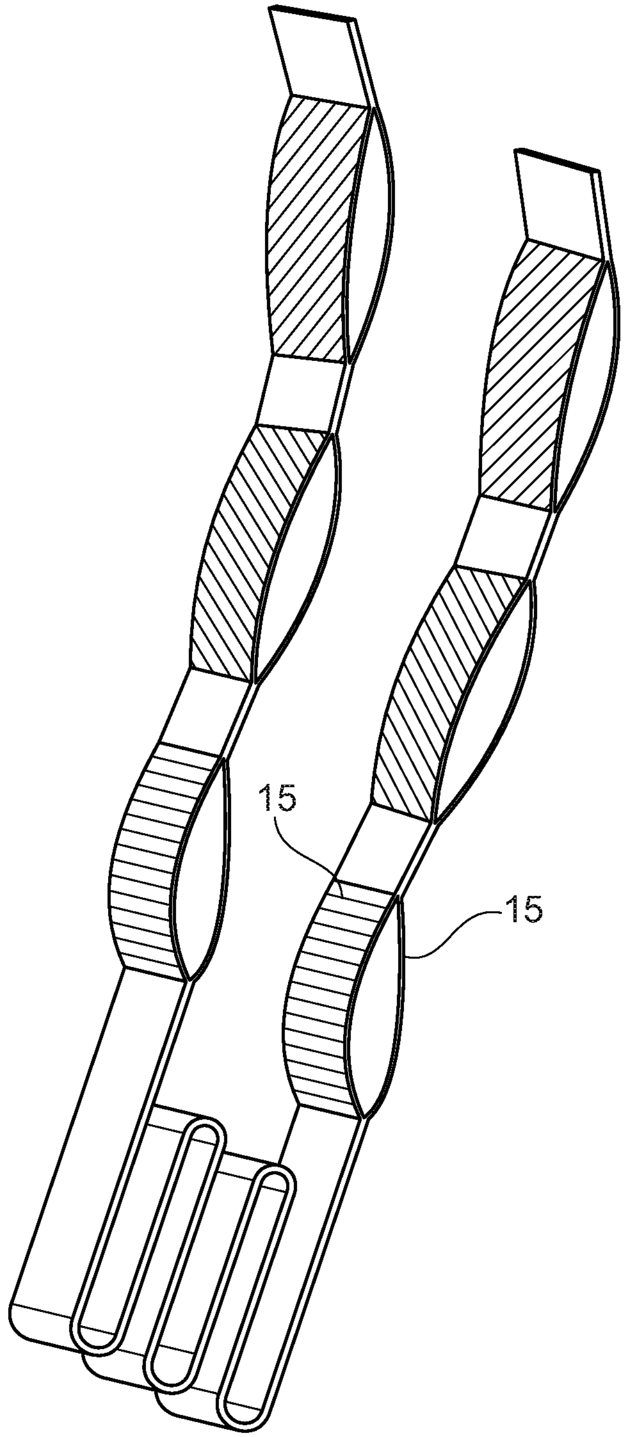
FIG. 10 shows a perspective view of straps according to embodiments of the invention joined together with an intermediate piece.

FIG. 10 shows the same two straps 1 joined together by a third section 26, as shown in FIG. 9, with the third section folded together. The third section may be folded, so that it forms a fold, which can receive the edge 41 of a sling (not shown) and be sewn to the sling along the edge 41. This gives a very durable connection to the sling, as the forces that arise during loading are distributed over a large area. Furthermore, the third section acts as protection against wear and soiling of the sling.

FIGS. 11*a* and 11*b* show straps according to embodiments of the invention, where the colors and/or patterns 33 on the outsides 15 in each partial section consist of colored stripes in the longitudinal direction, where each colored stripe is established on only a part of the width of the strap in the transverse direction.

FIG. 11*c* shows schematically how these stripes are formed by warp of different colors, where each color of warp only takes up a part of the width of the strap.

Figure 11D:
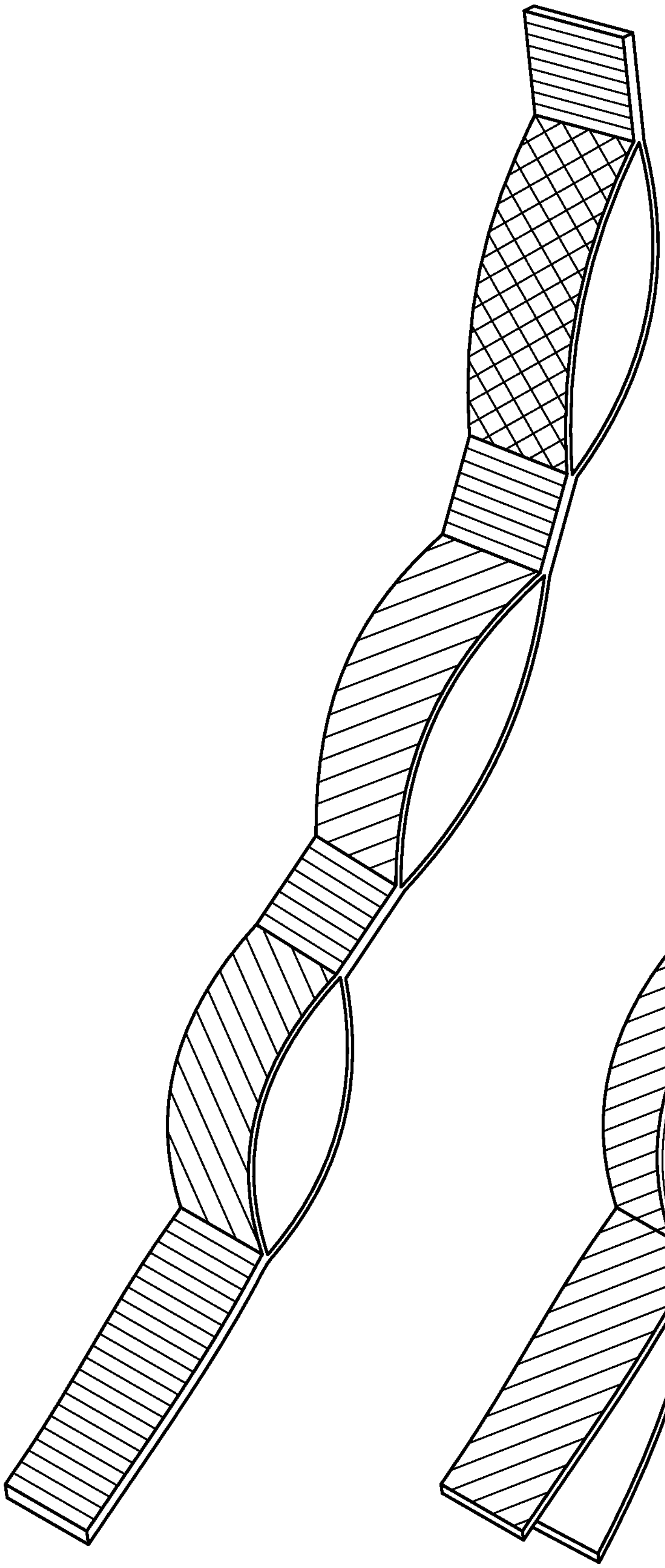

FIG. 11*d* shows a strap where the colors and/or patterns 33 on the outsides are established over the whole width of the strap in the transverse direction. The colors and/or patterns 33 are provided on the second sections of the strap.

Figure 11E:
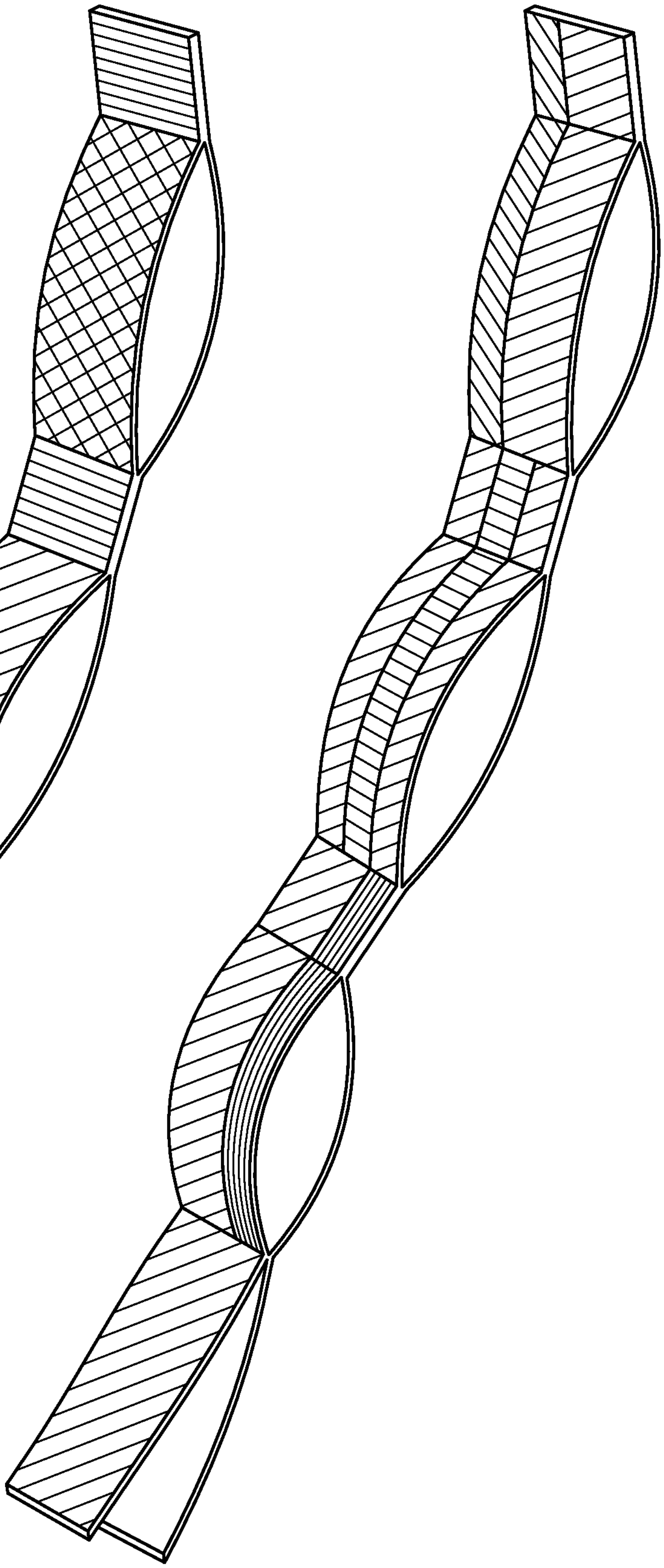

FIG. 11*e* shows a strap where the colors and/or patterns 33 on the outsides are established on only a part of the width of the strap in the transverse direction. The colors and/or patterns 33 are provided on the second sections of the strap and on one of the adjacent first sections of any other section.

FIGS. 12 *a-b* show sketches of a strap according to embodiments of the invention, which comprises elastic threads in one part of the longitudinal direction of the strap. On the left, the strap is shown in the loaded state, where the elastic threads 45 are expanded, and the length of the strap is increased. On the right, the strap is shown in the unloaded state, where the elastic threads 45 reduce the length of the strap. The straps are thus lifted up from the floor when the sling is left ready for use, for example on a bed or a chair.

The elastic threads may either be internal, or they may be woven in. The part of the strap that comprises elastic threads may advantageously be formed as a tubular part. The elastic threads 45 in the third section of the strap are shown.

For clarity of the drawing, hatching of colors and/or patterns is omitted in FIG. 12*b*.

FIG. 12*c* shows sketches of a strap according to embodiments of the invention, which comprises an elastic element in one part of the longitudinal direction of the strap. On the left, the strap is shown in the loaded state, where the elastic element 47 is expanded, and the length of the strap is increased. On the right, the strap is shown in the unloaded state, where the elastic element 47 reduces the length of the strap. The straps are thus lifted up from the floor when the sling is left ready for use, for example on a bed or a chair.

The elastic element 47 may, in a preferred embodiment, either be internal or may be woven in. The part of the strap that comprises the elastic element 47 may advantageously be formed as a tubular part. The elastic element 47 can be seen in the third section of the strap.

For clarity of the drawing, hatching of colors and/or patterns is omitted in FIG. 12*c*.

Figure 13B:
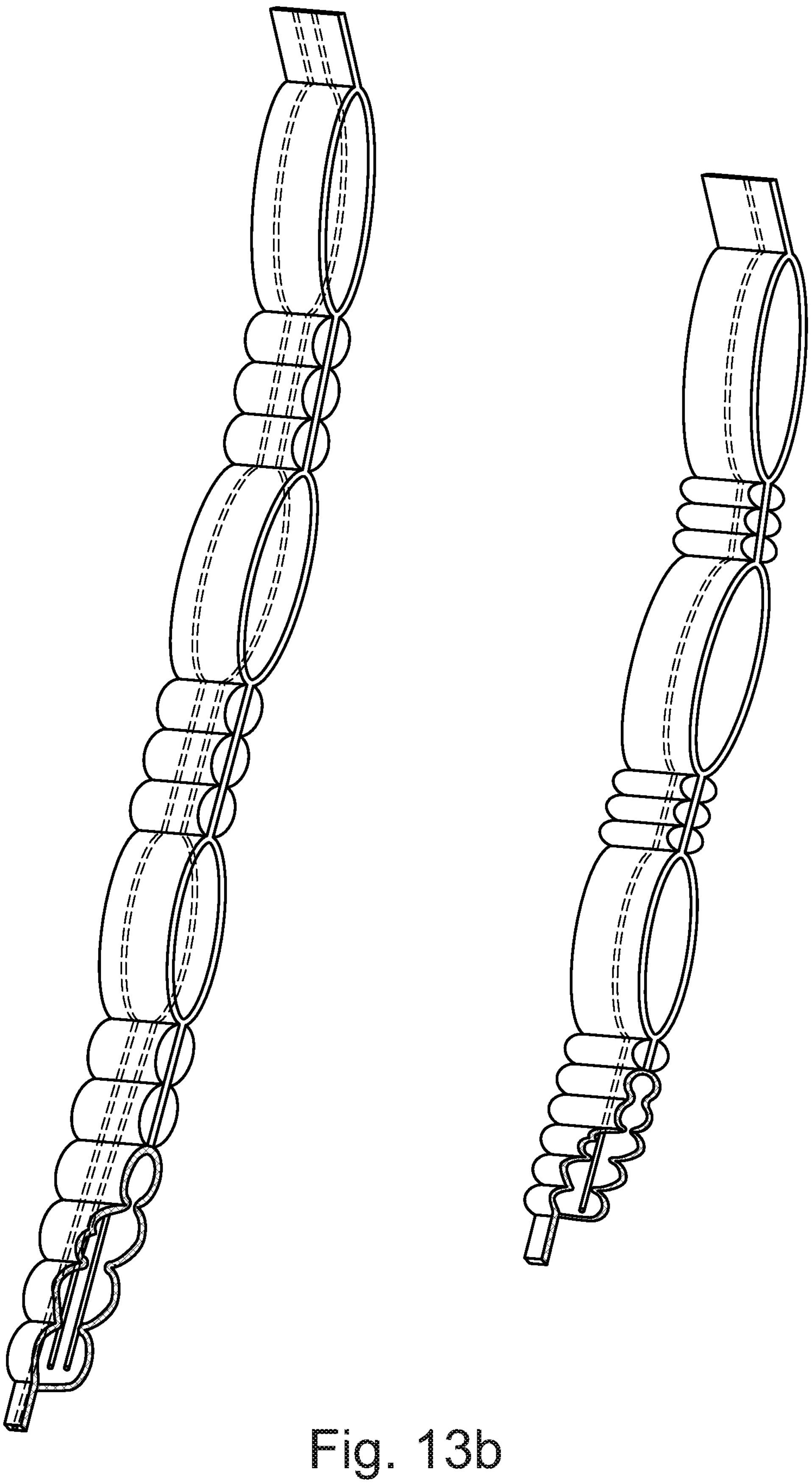

FIGS. 13 *a-b* show a strap 1 according to embodiments of the invention, which comprises elastic threads in one part of the longitudinal direction of the strap. A part of the first sections 23 comprises elastic threads. On the left, the strap is shown in the loaded state and on the right in the unloaded state. Colors and/or patterns 33 shown in FIG. 13*a* comprise a second section and a part of the adjacent first sections. In FIG. 13*b*, marking of colors and/or patterns is omitted for clarity. The elastic threads 45 in the strap can be seen.

FIG. 14 shows a sling 3 in use with a person in the sling 3 with straps 1 according to embodiments of the invention. The straps 1 are joined together with third sections 26, forming a fold, and sewn on the edge 41 of the sling 3. Two different perspective views are shown.

FIGS. 15 *a-b* show a strap 1 according to embodiments of the invention, where the first belt 9 and the second belt 11 are displaced relative to one another in the transverse direction 22 parallel to the wefts 19. FIG. 15*a* shows a perspective view of the strap, and FIG. 15*b* shows a cross-section through the strap 1 in one of the first sections 23 of the strap 1.

FIG. 16 shows a strap 1 according to embodiments of the invention, where the colors and/or patterns 33 are applied on first sections 23 of the strap 1. The colors and/or patterns 33 mark the adjacent second section 25.

FIG. 17 shows a strap 1 according to embodiments of the invention, where markings are applied in the form of numbers in second sections of the strap and colors and/or patterns 33 on an adjacent first section. The numbers and the color and/or pattern 33 characterize each eye in the strap 1 unambiguously.

At one end edge the strap 1 is connected to a third section 26, which is formed as an extension of the strap 1. The strap and the third section 26 are produced with continuous warps 17. The third section 26 is produced with interweaving of the longitudinal lateral edges of the two belts, so that the third section is tubular.

FIG. 18 shows a strap 1 according to embodiments of the invention. The strap is connected at one end edge to a third section, which is formed as an extension of the strap. The strap and the third section are produced with continuous warps. The third section is produced with interweaving of the longitudinal lateral edges of the two belts, so that the third section is tubular.

FIG. 19 shows a strap 1 according to embodiments of the invention. Each eye in the strap is characterized unambiguously with a color and/or pattern 33 in the middle of the second sections 25. The marking only comprises a part of the second sections. It is square. Alternatively, it may be oblong.

FIG. 20 shows a strap 1 according to embodiments of the invention. Each eye in the strap is characterized unambiguously with one or more stripes with a color and/or pattern in the middle of the second sections. In the part of the strap that is fastened to the sling 3 (not shown), the first belt 9 and the second belt 11 of the strap are not interwoven. The strap may then be fastened on two sides of the sling 3 for example by sewing. For example, it may be sewn through both belts and the sling. A very durable assembly is formed.

FIG. 21 shows a strap 1 according to embodiments of the invention. The strap is connected on one end edge to a third section, which is formed as an extension of the strap. The strap and the third section are produced with continuous warps. The at least three layers of the first and second belt of the third section are interwoven in a different weaving width than the strap.

FIG. 22 shows a strap 1 according to embodiments of the invention. The strap is connected on one end edge 5 to a third section, which is formed as an extension of the strap. The strap and the third section are produced with continuous warps. The at least three layers of the first and second belt of the third section are interwoven in a different weaving width than the strap.

Each eye in the strap is characterized with colors and/or patterns in a part of the adjacent first sections of the eye.

FIGS. 23 and 24 shows straps according to embodiments of the invention. The straps are connected on one end edge to a third section, which is formed as an extension of the strap. The strap and the third section are produced with continuous warps. The at least three layers of the first and second belt of the third section are interwoven in a different weaving width than the strap.

The straps 1 are fastened to a sling 3. Only one section 49 of the sling can be seen.

FIG. 25 shows a strap according to embodiments of the invention. The strap is provided with an extra eye near the part of the strap that is fastened to the sling (not shown). This extra eye may be used for holding the projecting part 51 of the strap close to the sling. The projecting part of the strap is the part that projects beyond the sling. See also FIG. 27.

FIG. 26 shows a strap according to embodiments of the invention. The strap is provided with an extra eye near the part of the strap that is fastened to the sling (not shown). This extra eye may be used for holding the projecting part 51 of the strap close to the sling. The projecting part of the strap is the part that projects beyond the sling. See also FIG. 27.

The extra eye of the strap may have a different color combination and/or pattern than the other eyes in the strap.

FIG. 27 shows a strap according to embodiments of the invention. The strap is provided with an extra eye near the part of the strap that is fastened to the sling 3. A section 49 of the sling can be seen. This extra eye 53 may be used for holding the projecting part 51 of the strap close to the sling, by inserting the free end 55 of the strap in the extra eye of the strap, as shown in the figure.

FIG. 28 shows a strap 1 according to embodiments of the invention. Each eye in the strap may have a different color and/or pattern. In the part of the strap that is fastened to the sling (not shown), the first belt and the second belt of the strap are not interwoven. The strap may then be fastened on two sides of the sling, for example by sewing. For example, it can be sewn through both belts and the sling. A very durable assembly is formed.

FIG. 29 shows a strap 1 according to embodiments of the invention. Each eye in the strap may have different colors and/or patterns. In the part of the strap that is fastened to the sling (not shown), the first belt and the second belt of the strap are not interwoven. The strap may then be fastened on two sides of the sling, for example by sewing. For example, it can be sewn through both belts and the sling. A very durable assembly is formed.

FIG. 30 shows two straps 1, which are joined together at one end edge 5 by a third section 26, which is formed as an extension of the two straps 1. The two straps 1 and the third section 26 are produced with continuous warps (not shown), and the third section 26 is produced, by the at least three layers of the first and second belt of the third section being interwoven in a different weaving width than the straps. The two straps are put together oppositely oriented, i.e. laterally reversed. This can be seen from the color markings.

FIG. 31 shows the same two straps 1 joined together by a third section 26, as shown in FIG. 9. The third section may be fixed on the surface of a sling (not shown) and be sewn to the sling along the edge 41. This gives a very durable connection to the sling, as the forces that arise during loading are distributed over a large area. Furthermore, the third section acts as protection against wear and soiling of the sling.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A strap intended for a sling for persons, where the strap is elongated with short end edges and longer lateral edges and comprises a first belt and a second belt, where each belt comprises an inside and an outside, where the insides are turned towards one another, and the outsides are turned away from one another, where the first belt and the second belt comprise warps and wefts, where the strap has a longitudinal direction that is parallel to the warps, and a transverse direction that is parallel to the wefts, where in the longitudinal direction of the strap there are a number of first sections where the first belt and the second belt are interwoven, and second sections are provided between them, where the first belt and the second belt are not interwoven, so that an eye is formed in each of the second sections, where in the longitudinal direction of the strap there is a sequence of at least one of colors and patterns, marking each eye in the strap unambiguously, wherein at least three differently colored warps are provided as the warps and are produced in at least three different colors;

wherein each of the two belts comprises at least three layers comprising two outer layers and at least one intermediate layer;

wherein the warps are led in the two outer layers and in the at least one intermediate layer in each of the two belts;

wherein it is optional which of the three differently colored warps are used in the two outer layers and in the at least one intermediate layer of each of the two belts;

wherein the outer layers in each of the two belts define outsides of the strap; and wherein the outer layers in each of the two belts are produced in at least the same color and pattern in any section of the strap.

2. The strap according to claim 1, wherein at least one color and one pattern is only used once in the second section of a strap.

3. The strap according to claim 1, wherein the first belt and the second belt are identical.

4. The strap according to claim 1, wherein the strap comprises elastic threads at least in one part of the longitudinal direction of the strap.

5. The strap according to claim 1, wherein the strap comprises an elastic element at least in one part of the longitudinal direction of the strap.

6. The strap according to claim 1, wherein at one end edge the strap is connected to a third section, which is formed as an extension of the strap, wherein the strap and the third section are made with continuous warps, and wherein the third section is made with interweaving of the longitudinal lateral edges of one of the two belts.

7. The strap according to claim 1, wherein two straps are joined together at one end edge by a third section, which is formed as an extension of the two straps, and wherein the two straps and the third section are produced with continuous warps, and wherein the third section is made with interweaving of the longitudinal lateral edges of one of the two belts.

8. A method comprising:

producing a strap, wherein the strap is elongated with short end edges and longer lateral edges and comprises a first belt and a second belt, with each belt comprising an inside and an outside, with the insides turned towards one another and the outsides turned away from one another, with the first belt and the second belt comprising warps and wefts, with a longitudinal direction that is parallel to the warps, and a transverse direction that is parallel to the wefts, where a number of first sections are formed in the longitudinal direction of the strap, where the first belt and the second belt are interwoven, and second sections are provided between them, where the first belt and the second belt are not interwoven, so that an eye is formed in each of the second sections, and where at least one of a sequence of colors and patterns, marking each eye in the strap unambiguously, is formed in the longitudinal direction of the strap, wherein the warps are produced in at least three different colors, wherein the warps are led in two outer layers and at least one intermediate layer for each of the two belts and it is optional which of the three differently colored warps are used in the two outer layers and in the at least one intermediate layer, and producing the outer layers on both outsides of the strap in at least the same color and pattern in any section of the strap.

9. Use of a strap according to claim 1, where the strap is used for lifting a sling for a person together with at least one further strap, and where the straps are fastened to a sling for persons.

* * * * *